(12) United States Patent
Ozawa et al.

(10) Patent No.: US 11,118,635 B2
(45) Date of Patent: *Sep. 14, 2021

(54) POWER TRANSMISSION DEVICE

(71) Applicant: Kabushiki Kaisha F.C.C., Hamamatsu (JP)

(72) Inventors: Yoshihiko Ozawa, Hamamatsu (JP); Han Hiong Chen, Hamamatsu (JP); Makoto Kataoka, Hamamatsu (JP); Masataka Murai, Hamamatsu (JP); Kaoru Aono, Hamamatsu (JP); Yuta Kine, Hamamatsu (JP); Yuta Yokomichi, Hamamatsu (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/804,032

(22) Filed: Feb. 28, 2020

(65) Prior Publication Data
US 2020/0232520 A1    Jul. 23, 2020

Related U.S. Application Data

(63) Continuation of application No. PCT/JP2018/032062, filed on Aug. 30, 2018.

(30) Foreign Application Priority Data

Sep. 1, 2017    (JP) .............................. JP2017-168795

(51) Int. Cl.
*F16D 21/08*    (2006.01)
*F16D 11/10*    (2006.01)
(Continued)

(52) U.S. Cl.
CPC .............. *F16D 21/08* (2013.01); *F16D 11/10* (2013.01); *F16D 19/00* (2013.01); *F16D 25/0638* (2013.01)

(58) Field of Classification Search
CPC .................... F16D 43/10–12; F16D 13/52–56
See application file for complete search history.

(56) References Cited

U.S. PATENT DOCUMENTS

2009/0000898 A1 * 1/2009 Inomori .................. F16D 43/12
192/70.11
2014/0326570 A1 * 11/2014 Isobe ....................... F16D 13/56
192/70.11
(Continued)

FOREIGN PATENT DOCUMENTS

JP      62-143827       9/1987
JP      H10292831 A  *  11/1998
(Continued)

OTHER PUBLICATIONS

International Search Report dated Nov. 27, 2018 in corresponding PCT Application No. PCT/JP2018/032062.
(Continued)

*Primary Examiner* — Ernesto A Suarez
*Assistant Examiner* — Lillian T Nguyen
(74) *Attorney, Agent, or Firm* — Harness, Dickey & Pierce, P.L.C.

(57) ABSTRACT

A power transmission device has a back torque transmission cam that brings driving clutch plates 6 and driven clutch plates 7 into press contact with each other. A second clutch member 4b is moved when a rotational force is input to a first clutch member 4a via the output shaft 3. The pressure member 5 is located at a non-actuation position. A torque transmission portion transmits a rotational force transmitted (Continued)

to the second clutch member 4*b* to the first clutch member 4*a* not via the back torque transmission cam.

<div align="center">

5 Claims, 24 Drawing Sheets

</div>

(51) Int. Cl.
    *F16D 19/00*          (2006.01)
    *F16D 25/0638*     (2006.01)

(56) References Cited

U.S. PATENT DOCUMENTS

| | | |
|---|---|---|
| 2015/0041275 A1* | 2/2015 | Satou .................. F16D 13/40 |
| | | 192/66.31 |
| 2015/0337910 A1 | 11/2015 | Yoshimoto et al. |
| 2020/0200226 A1* | 6/2020 | Ozawa .................. F16D 13/52 |

FOREIGN PATENT DOCUMENTS

| | | |
|---|---|---|
| JP | H11 159547 A | 6/1999 |
| JP | 2017-101810 A | 6/2017 |
| WO | WO-2016/088860 A1 | 6/2016 |

OTHER PUBLICATIONS

Supplementary European Search Report dated Feb. 10, 2021 in corresponding European Application No. 18850089.6.

\* cited by examiner

[Fig. 1]
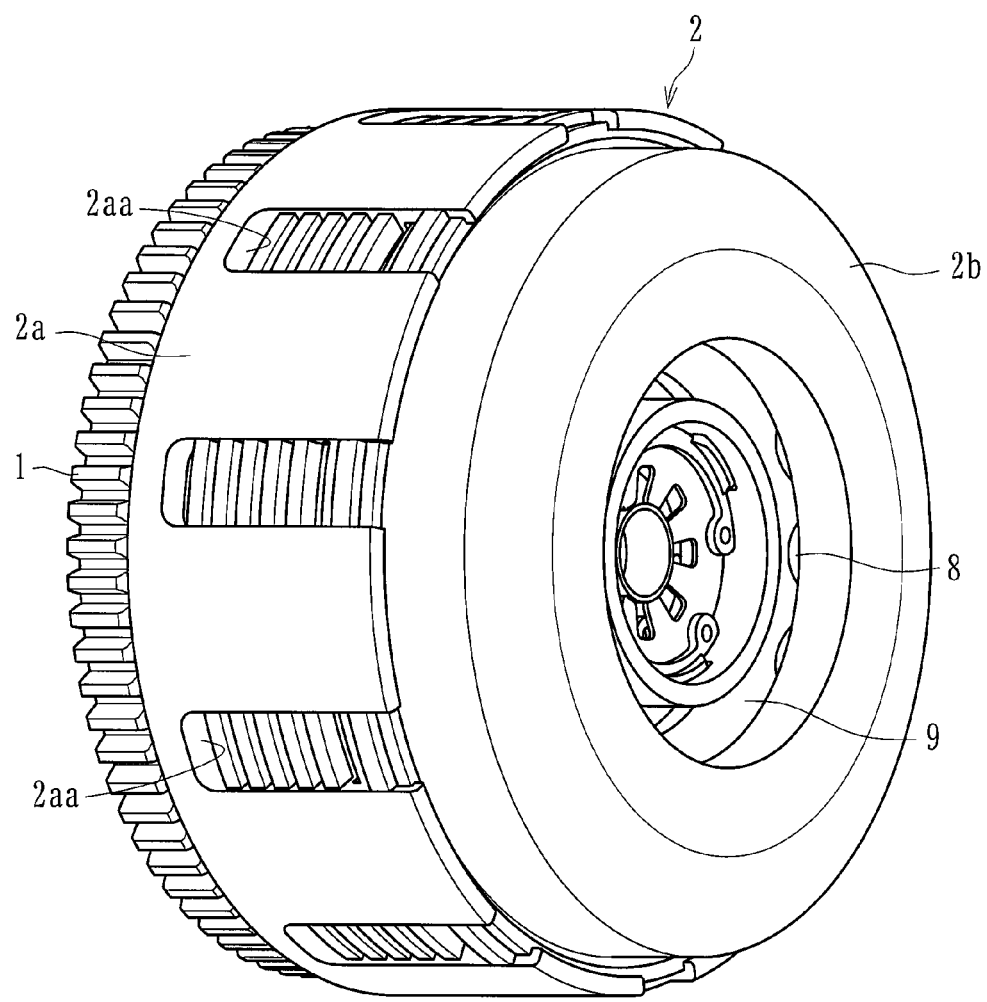

[Fig. 2]
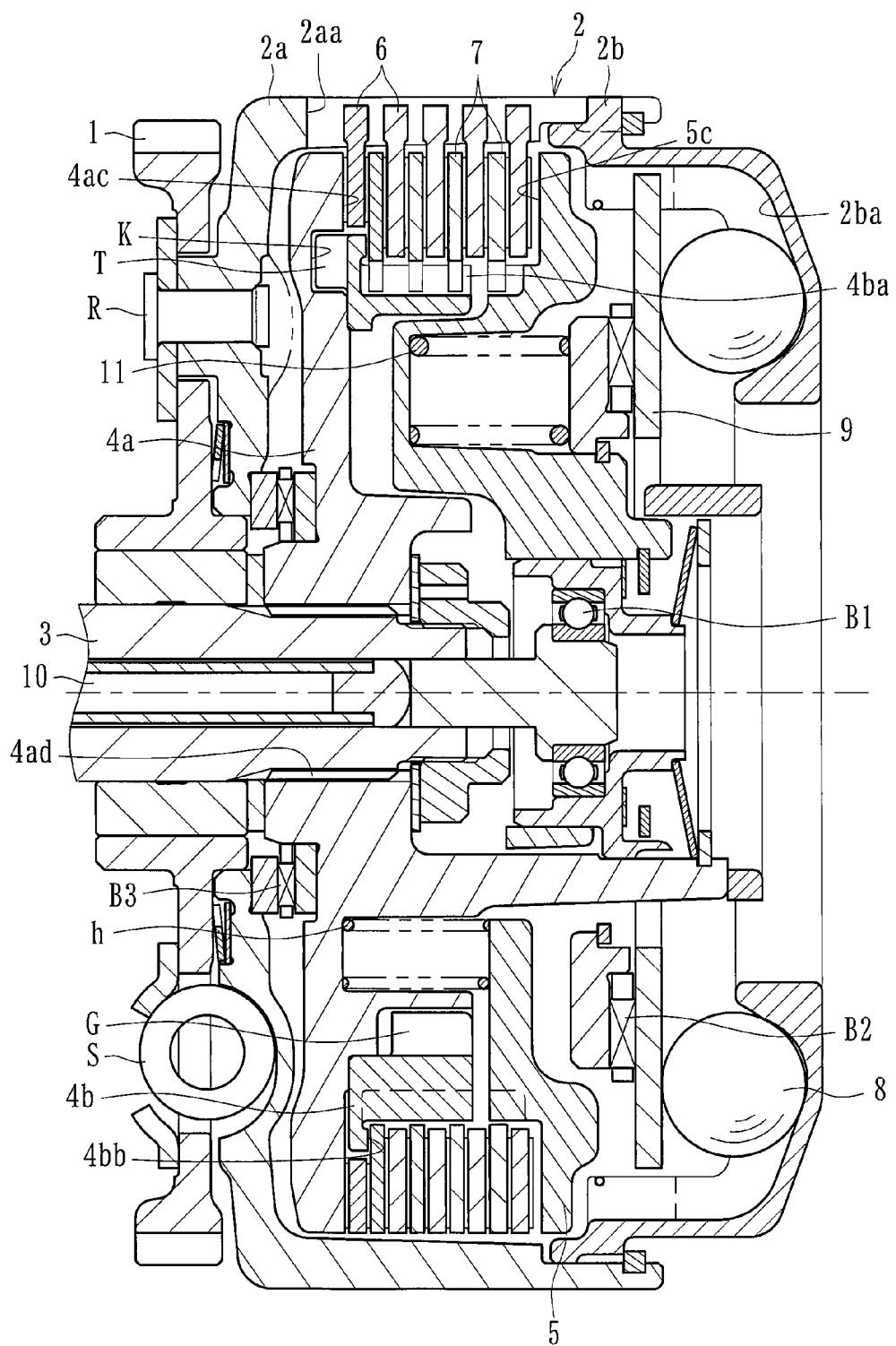

[Fig. 3]
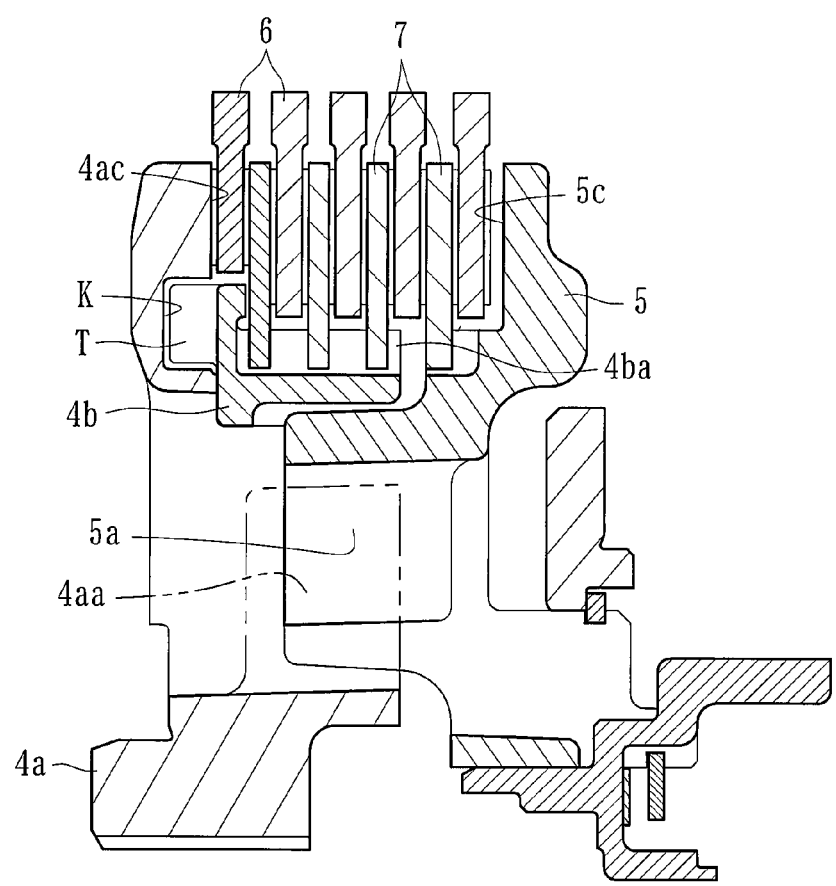

[Fig. 4]
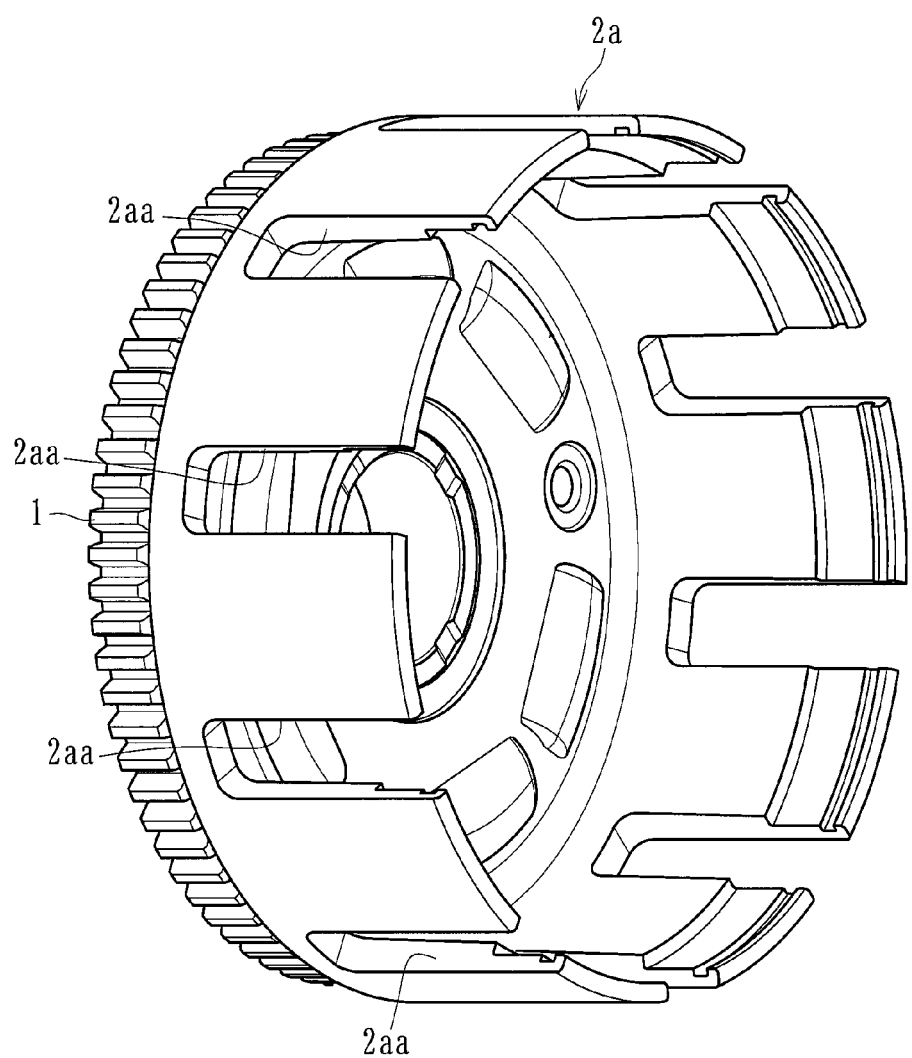

[Fig. 5]
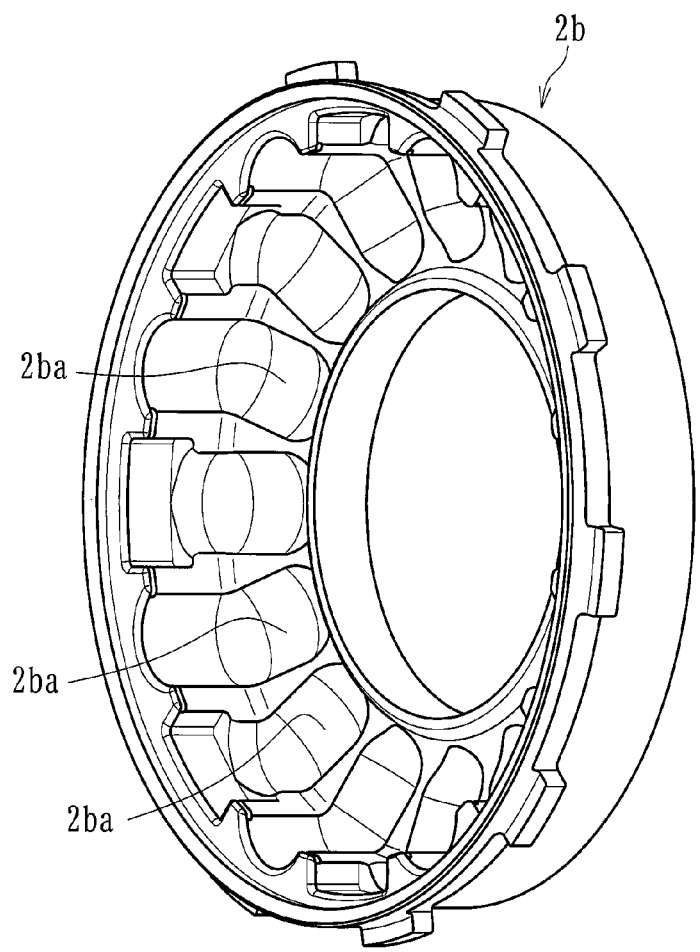

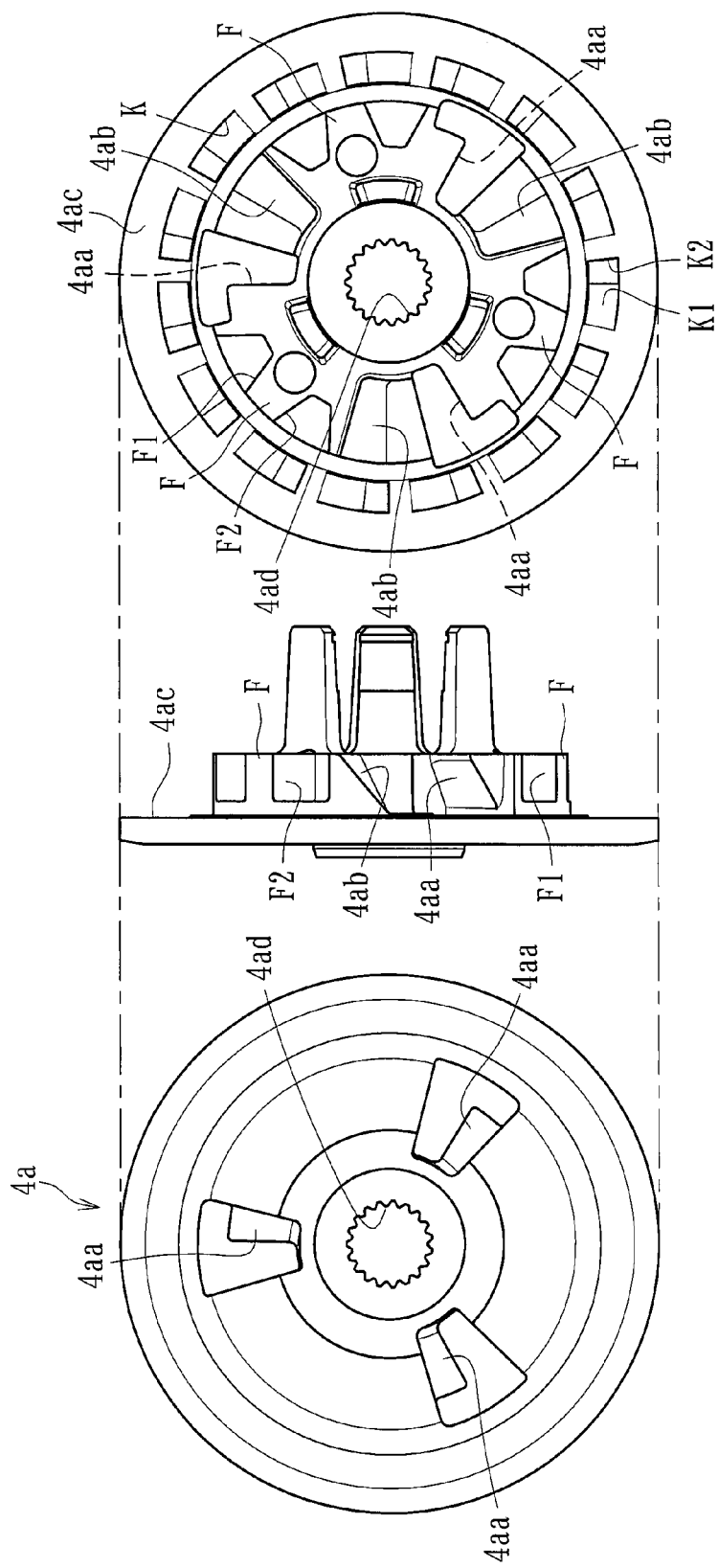
[Fig. 6]

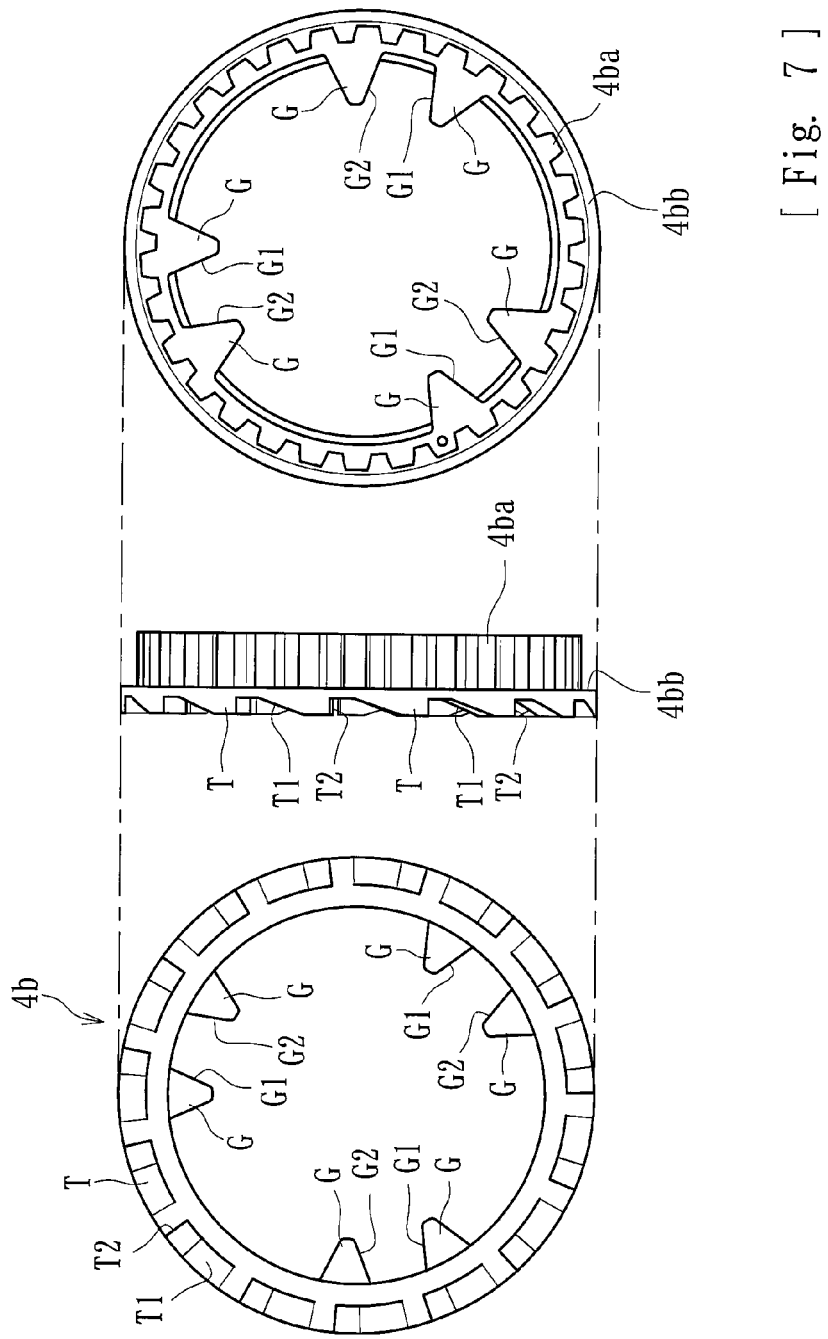

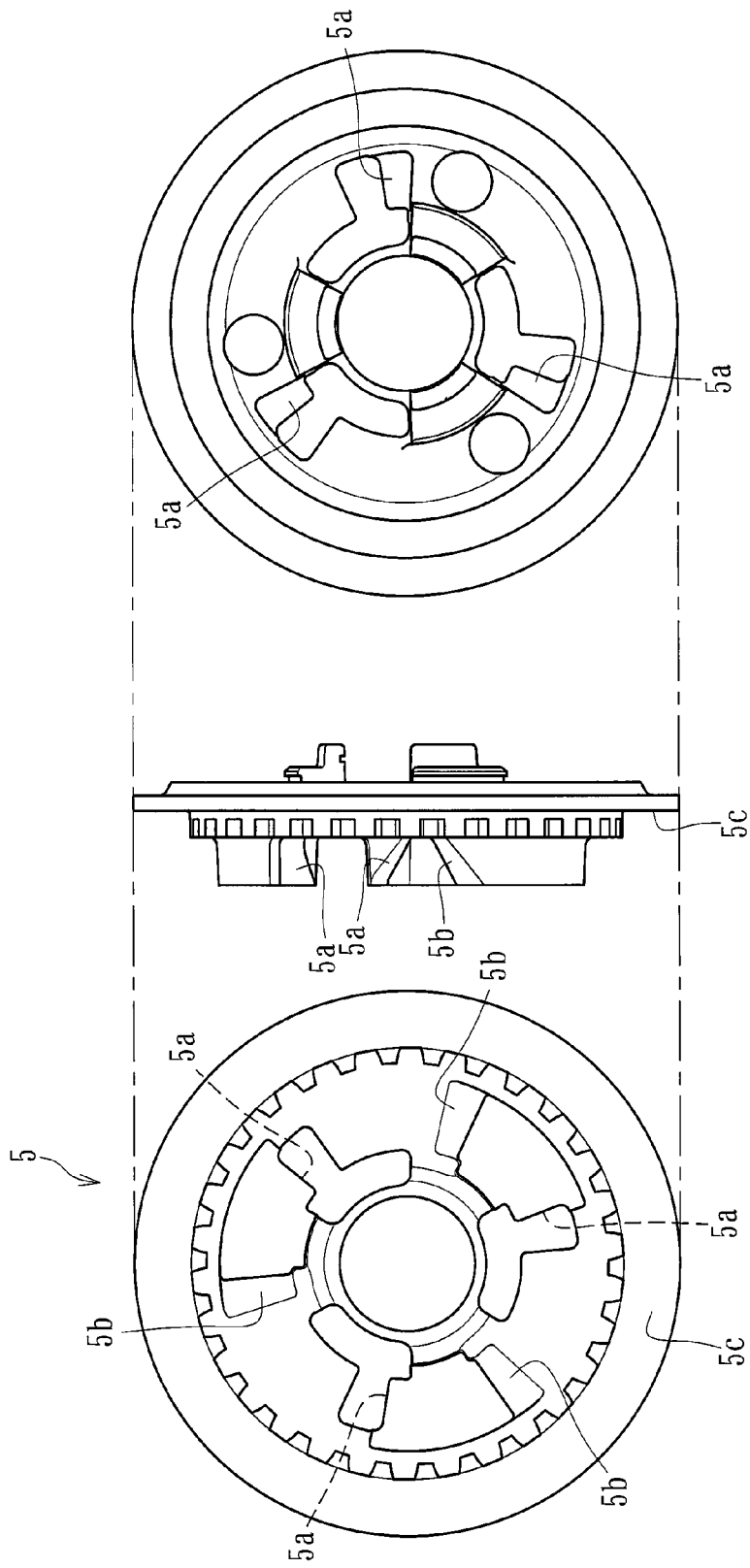
[Fig. 8]

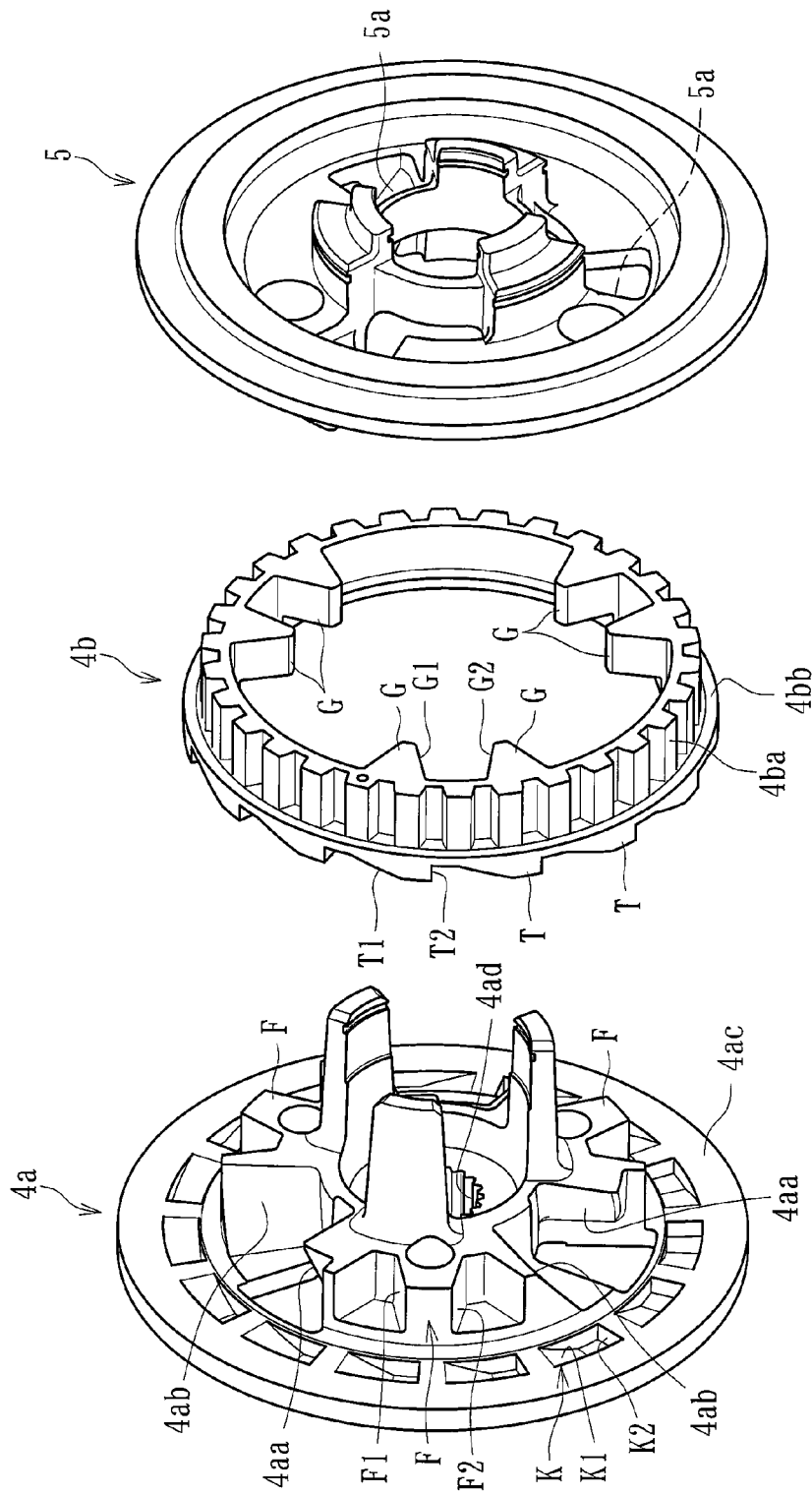
[Fig. 9]

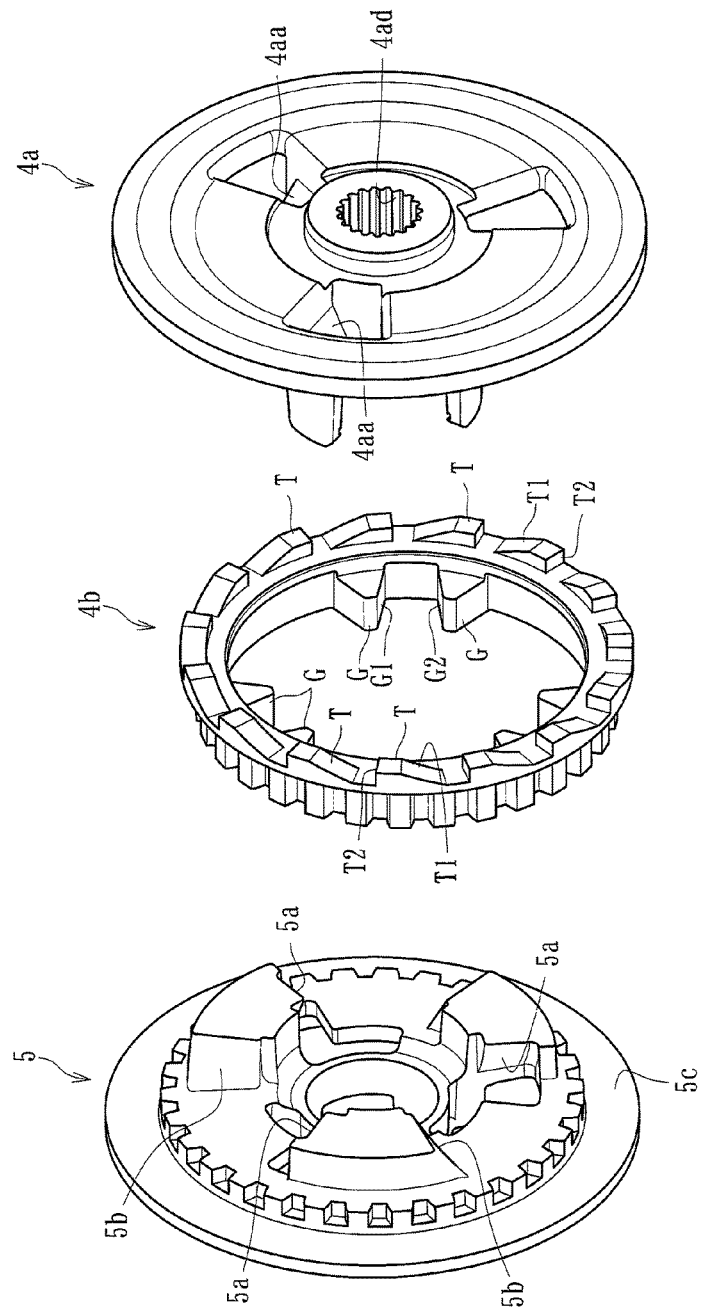

[Fig. 11]
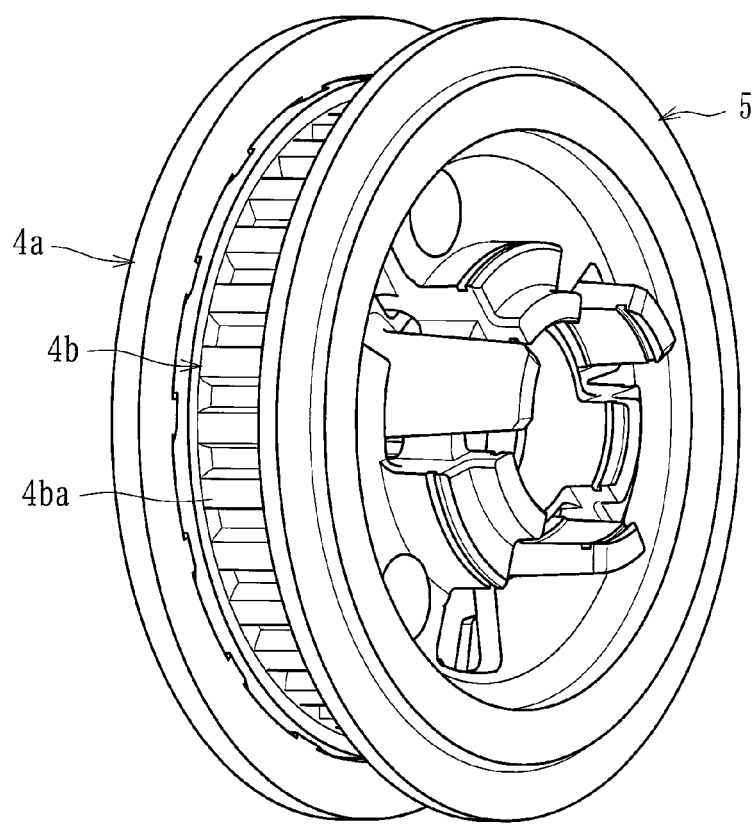

[ Fig. 12 ]
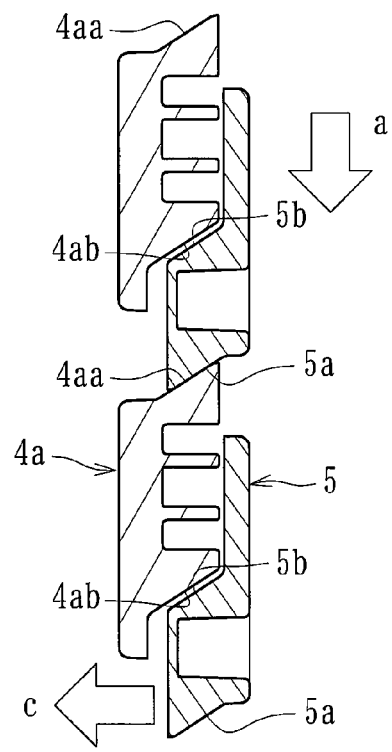
[ Fig. 13 ]
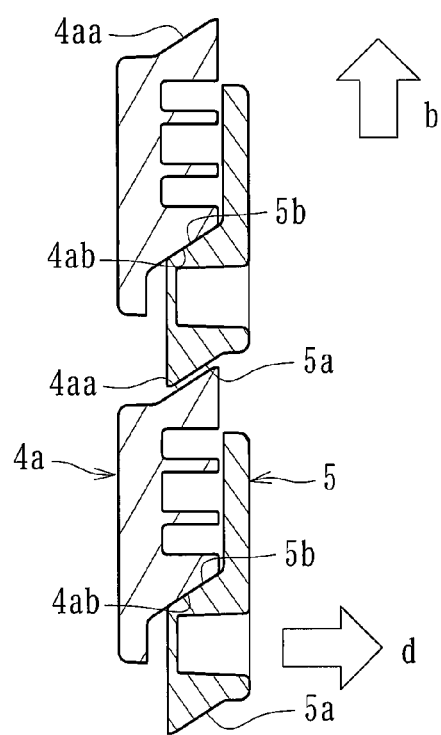

[Fig. 14]
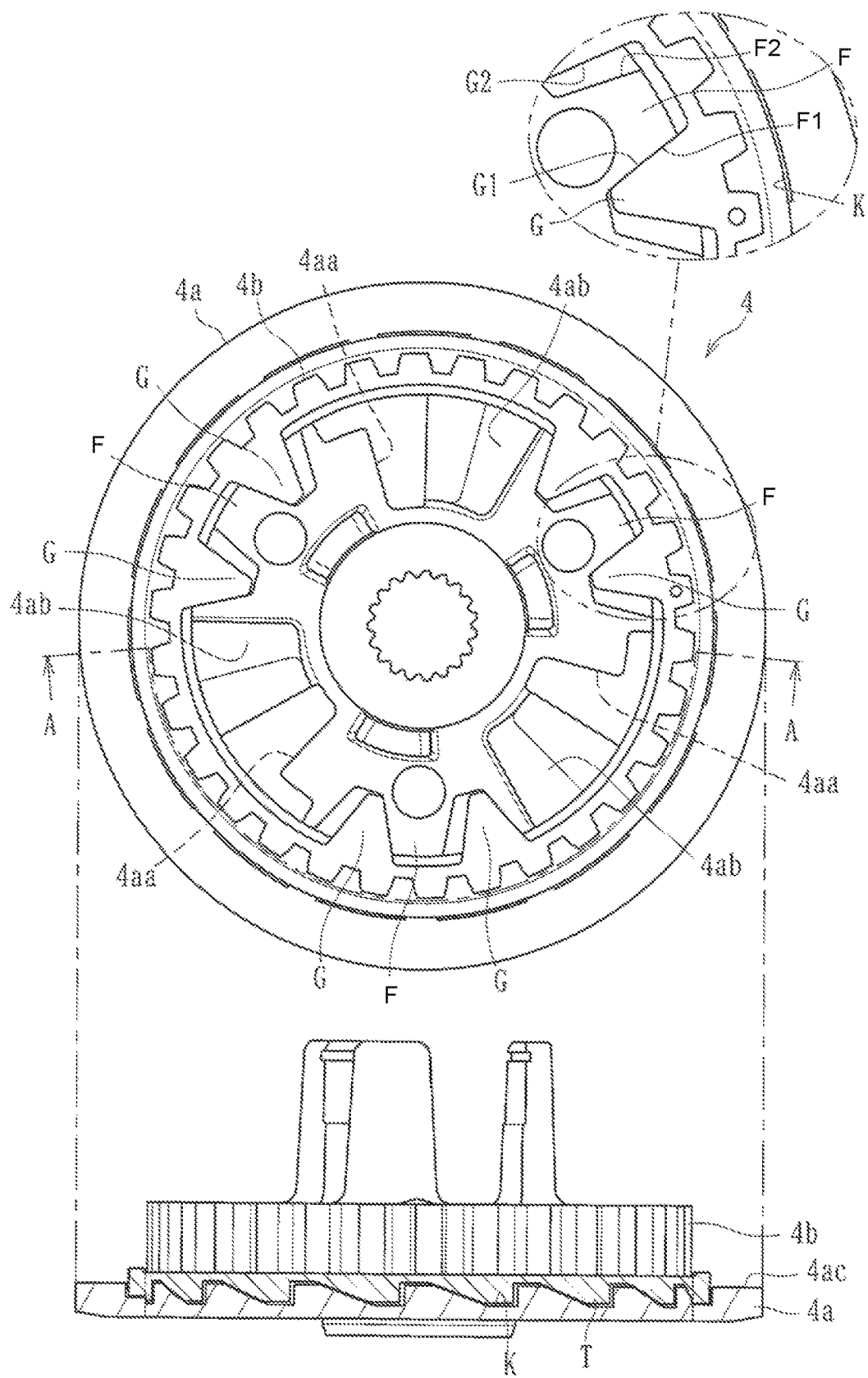

[Fig. 15]
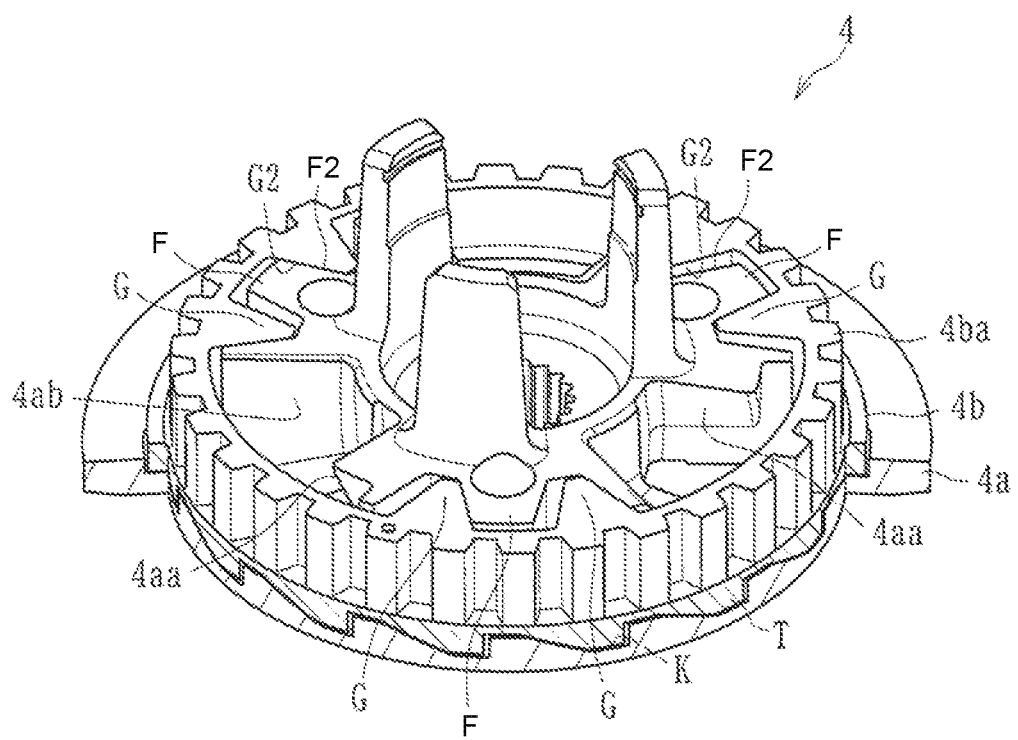

[Fig. 16]
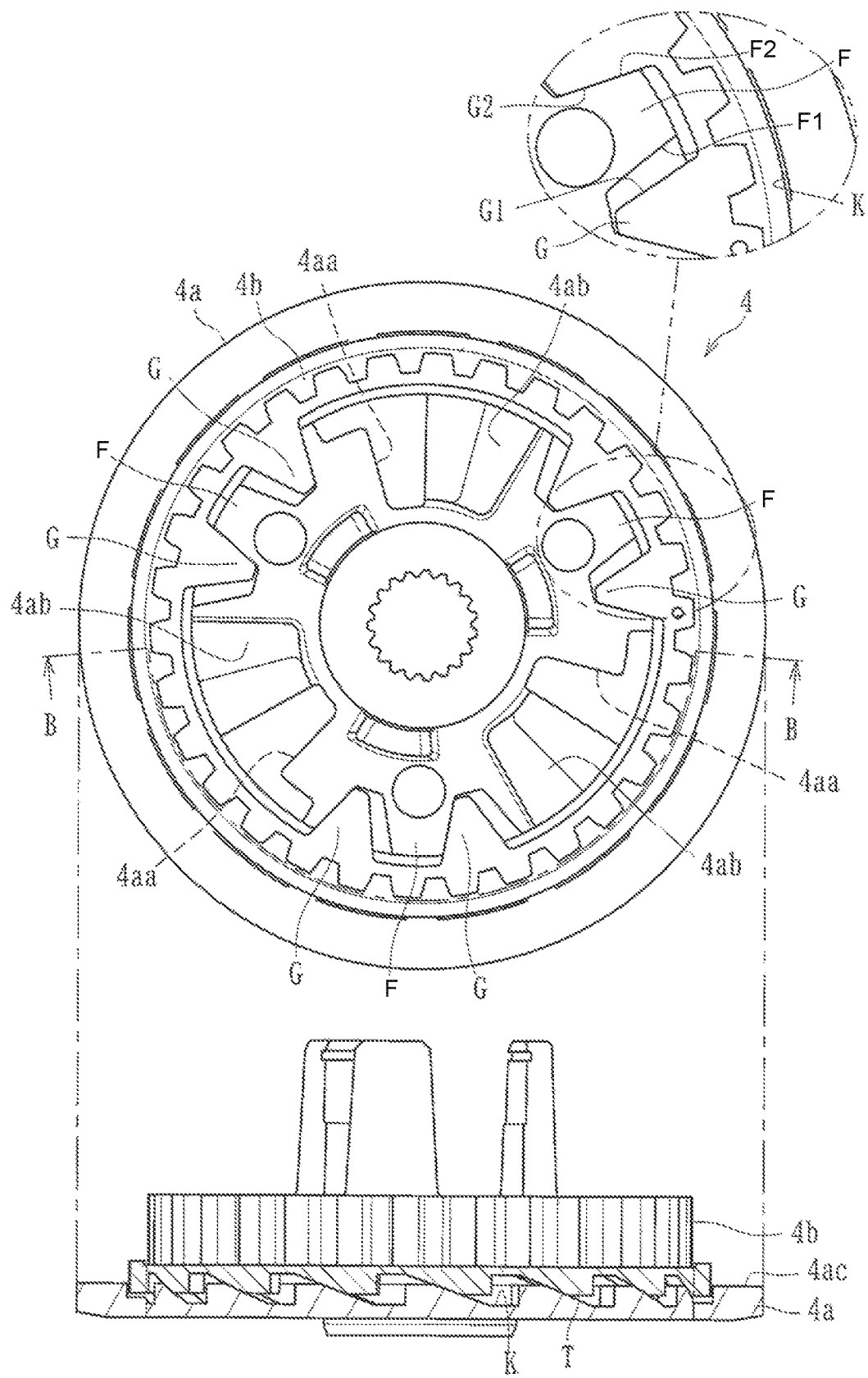

[Fig. 17]
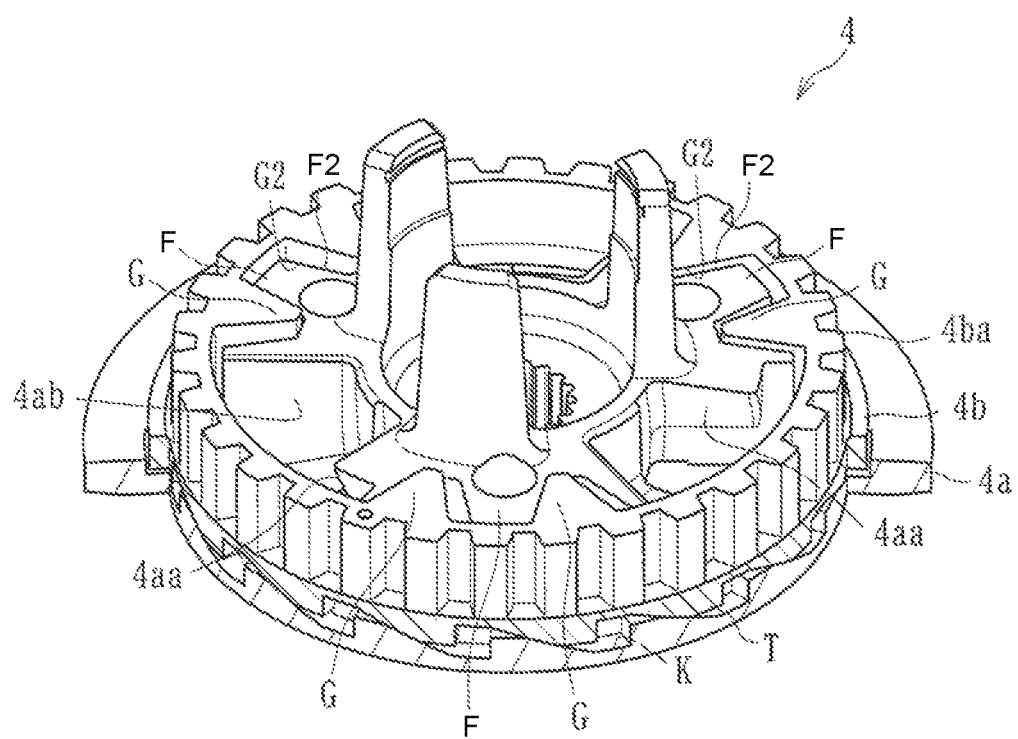

[ Fig. 18 ]
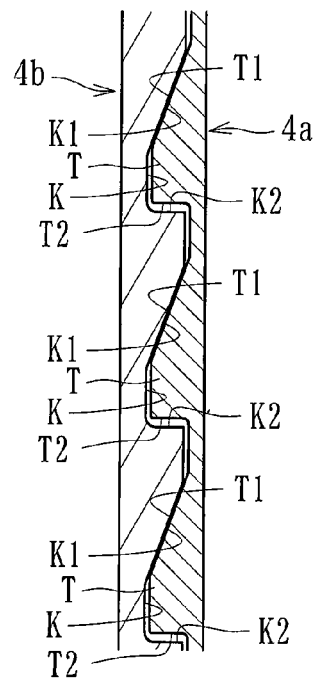
[ Fig. 19 ]
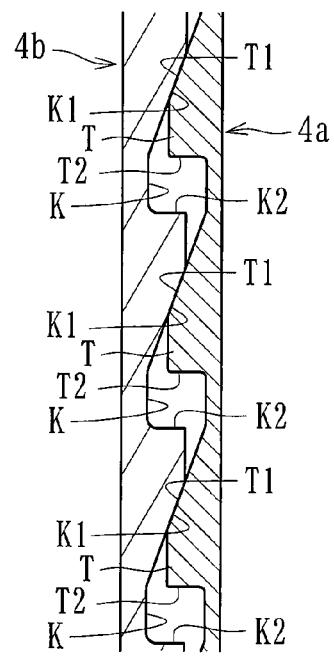

[Fig. 20]
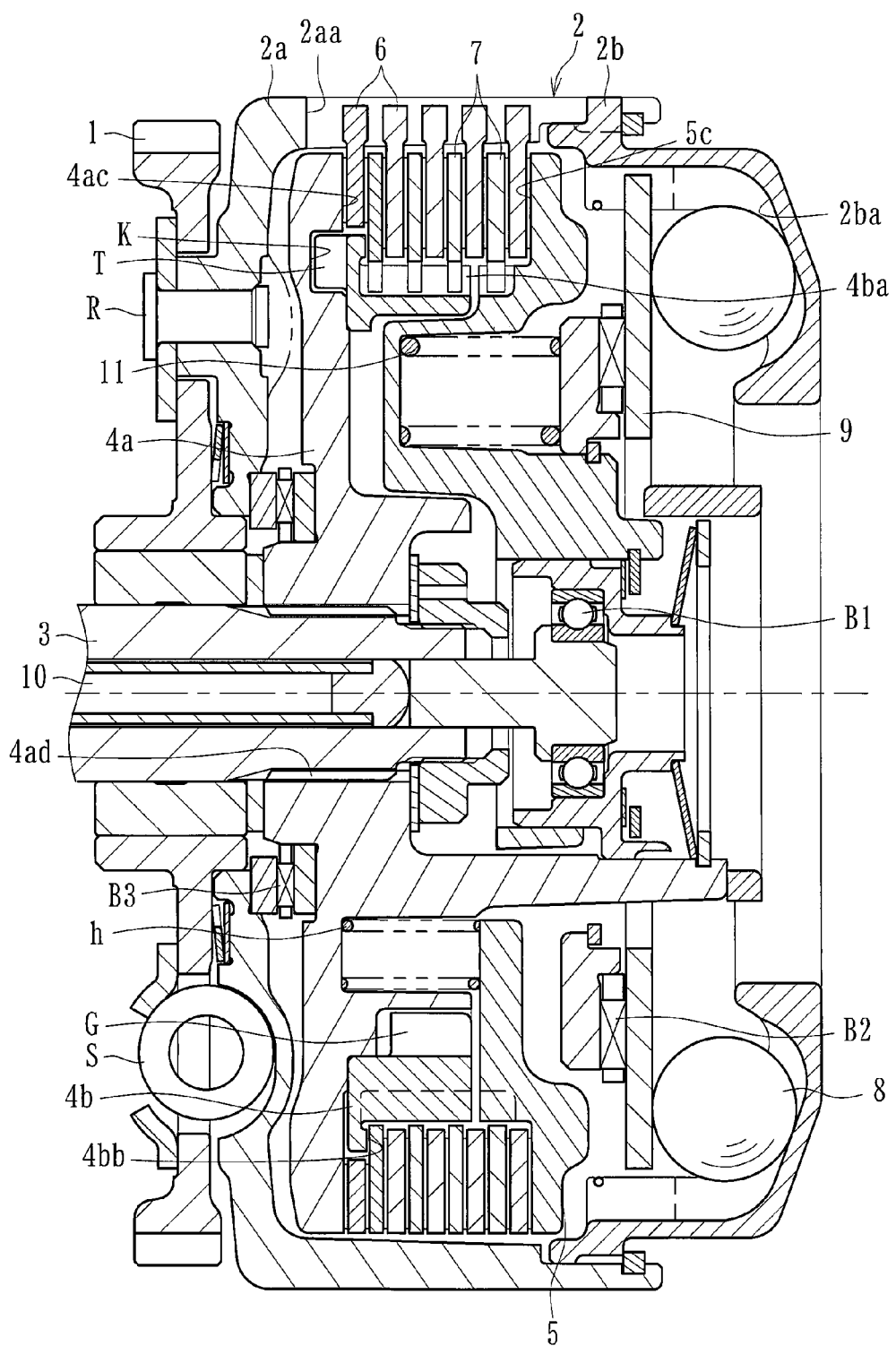

[Fig. 21]
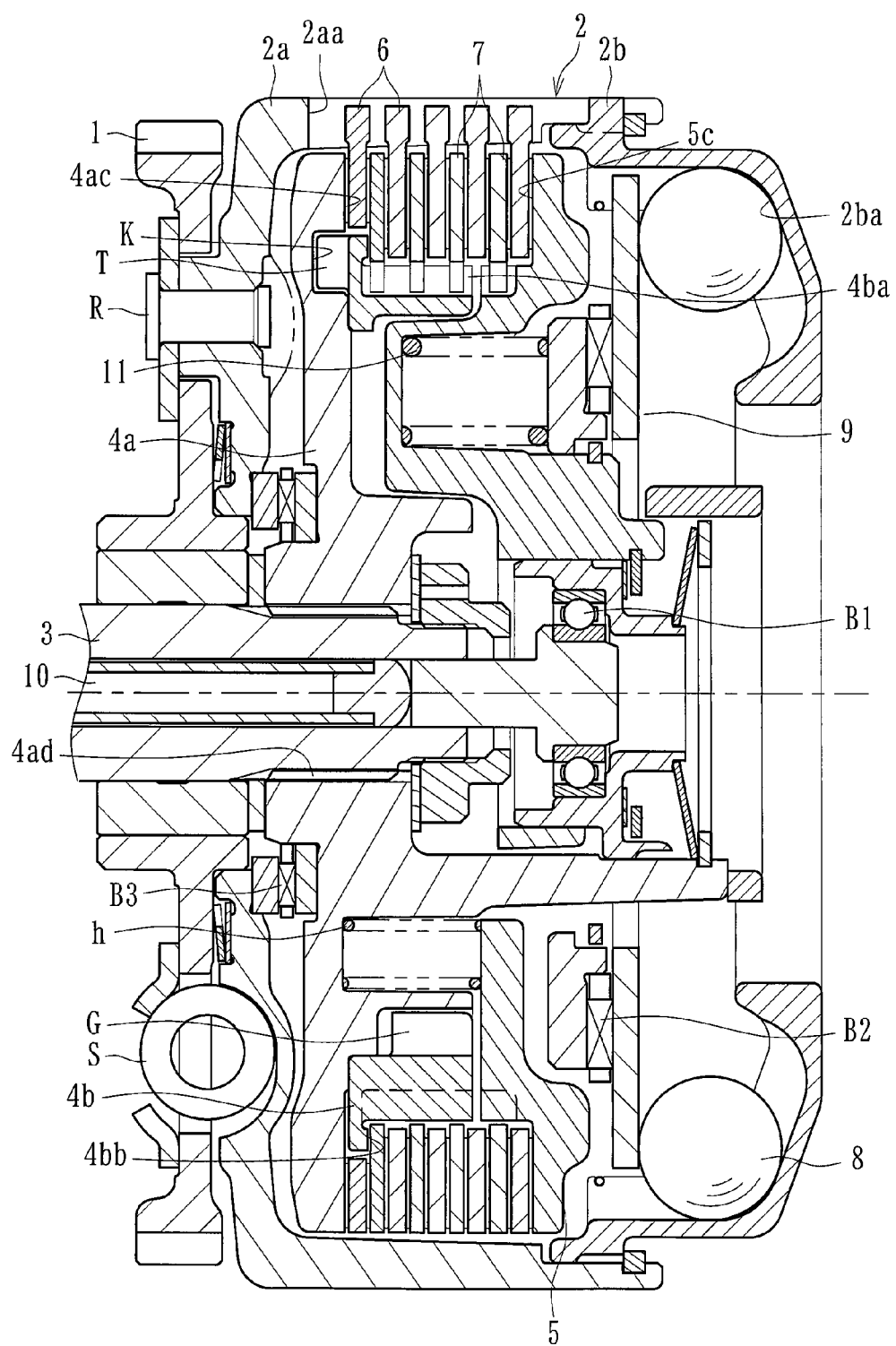

[Fig. 22]
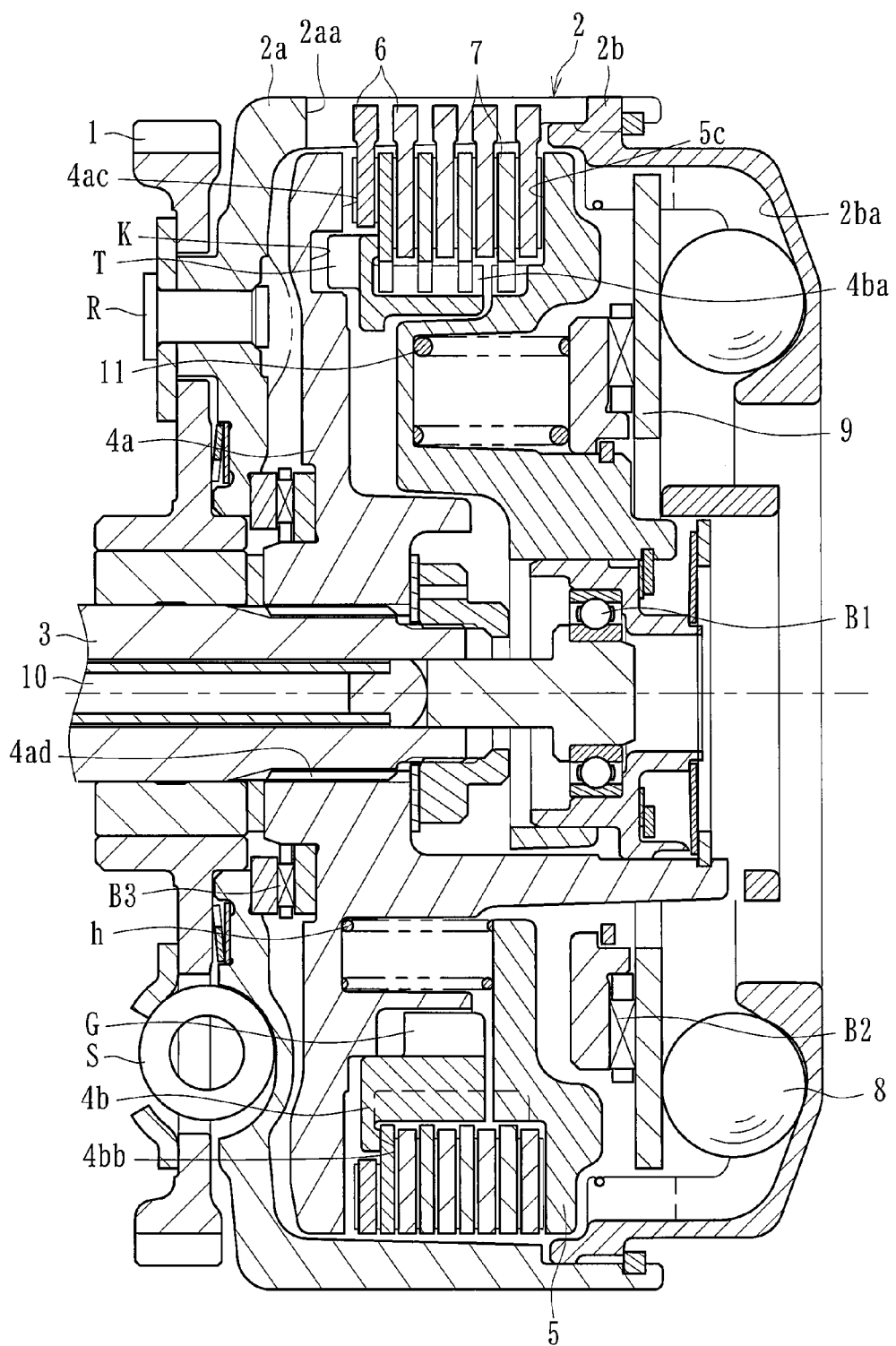

[Fig. 23]
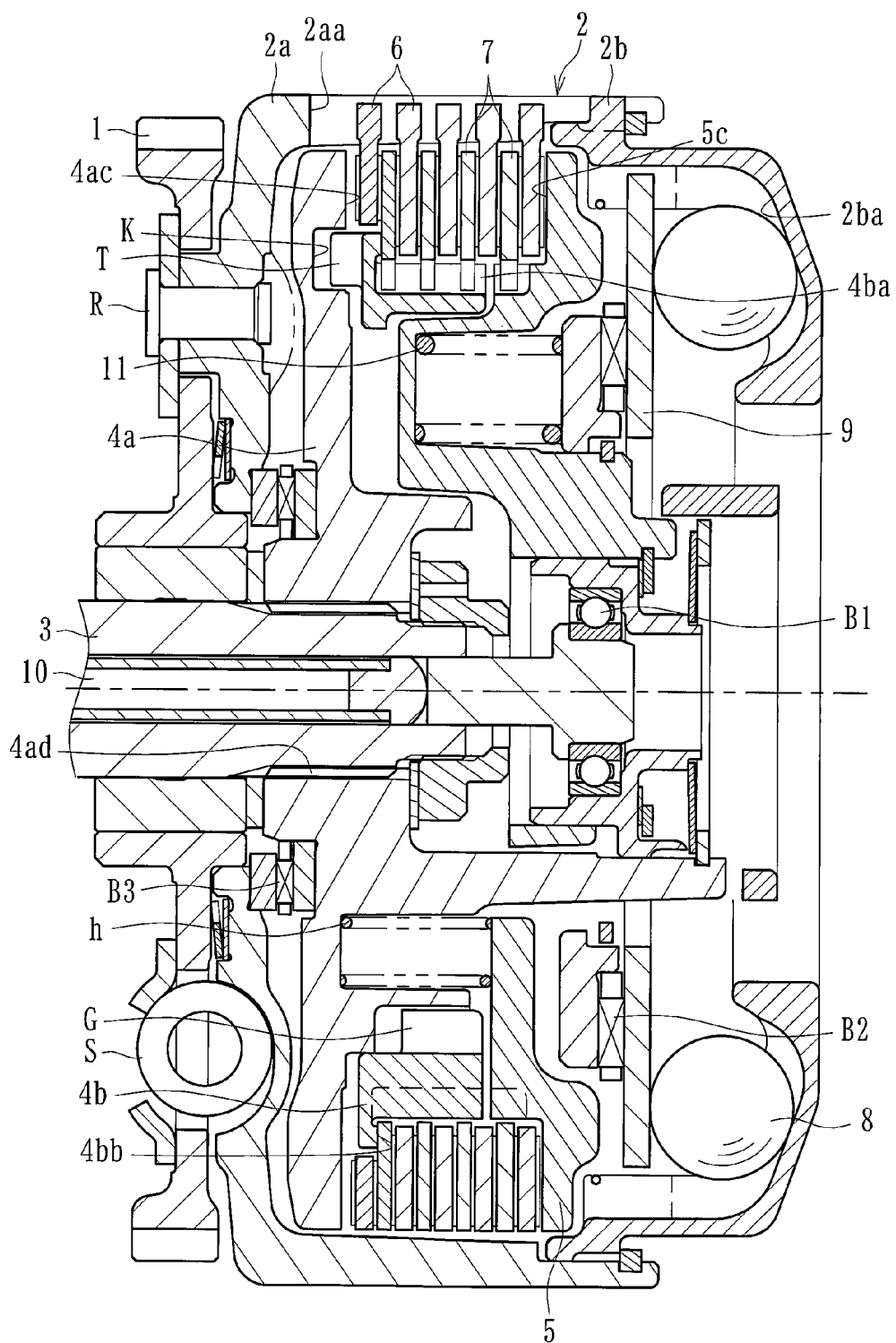

[Fig. 24]
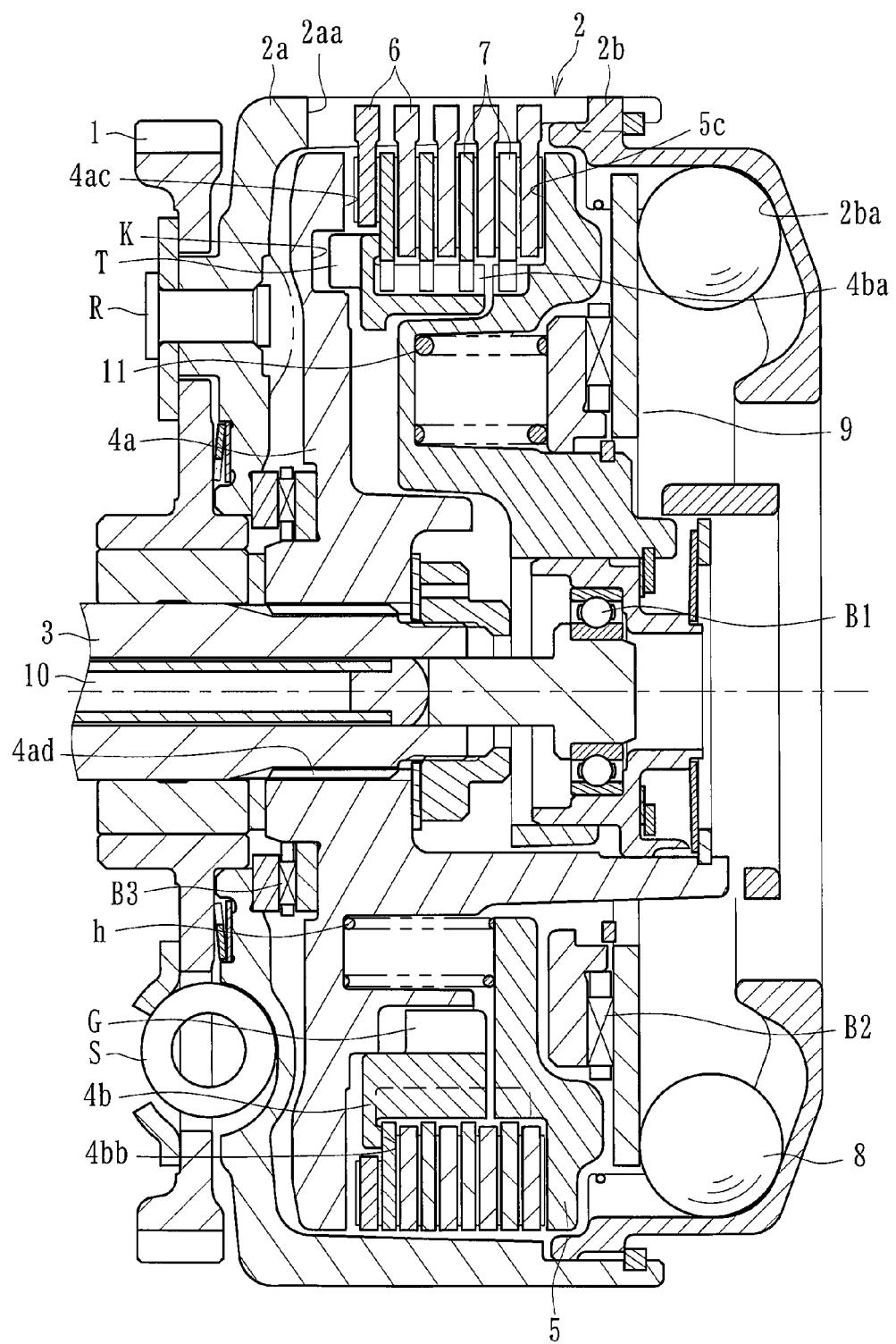

[Fig. 25]
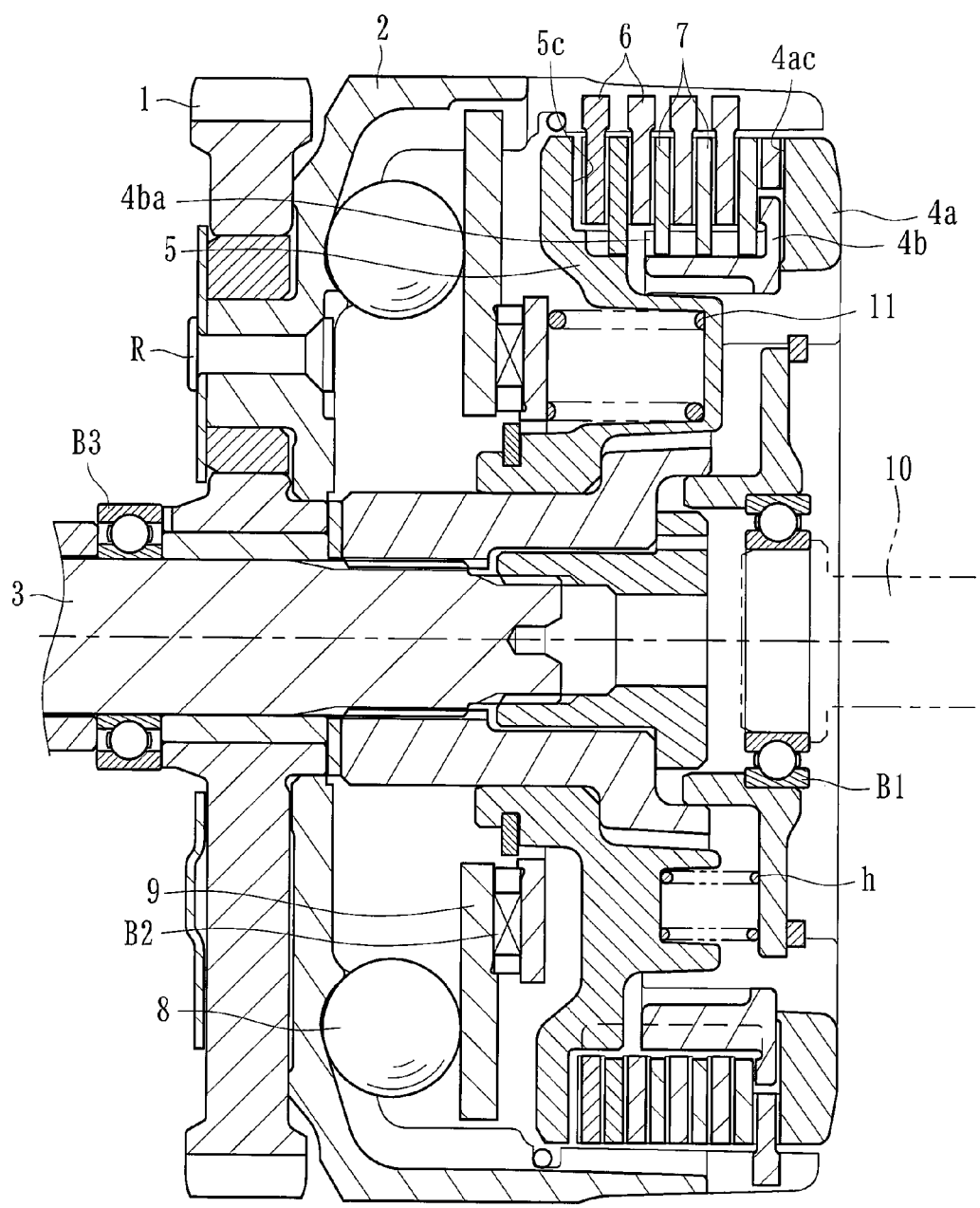

[Fig. 26]
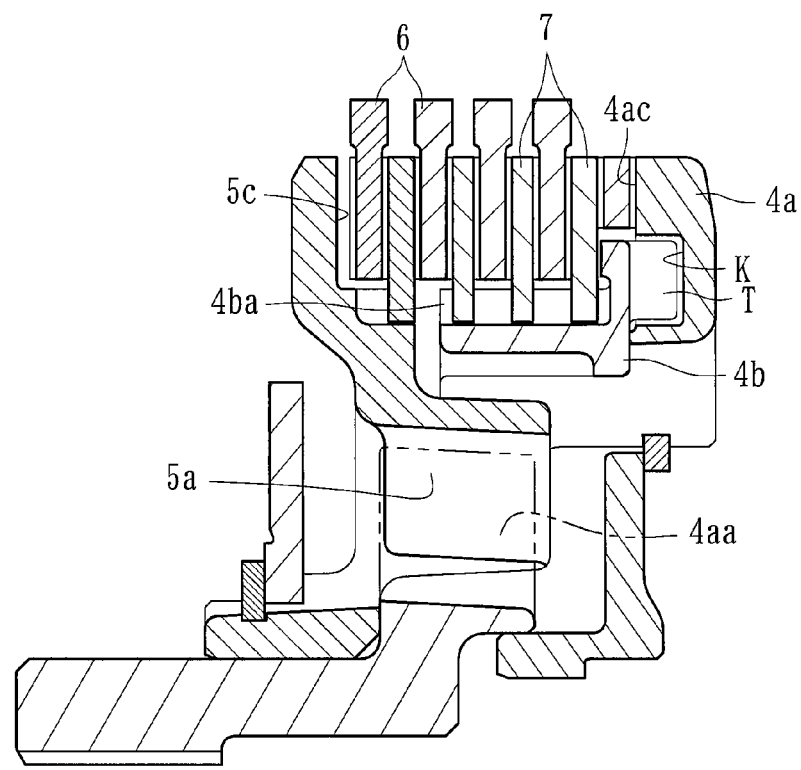

POWER TRANSMISSION DEVICE

CROSS-REFERENCE TO RELATED APPLICATIONS

This application is a continuation of International Application No. PCT/JP2018/032062, filed Aug. 30, 2018, which claims priority to Japanese Application No. 2017-168795, filed Sep. 1, 2017. The disclosures of the above applications are incorporating herein by reference. The present application is being concurrently filed with U.S. application Ser. No. 16/804,069, filed Feb. 28, 2020 entitled "Power Transmission Device", the specification and drawings of which is herein incorporated by reference.

FIELD

The present disclosure relates to a power transmission device that enables and blocks, as desired, transmission of a rotational force of an input member to an output member.

BACKGROUND

In general, a power transmission device of a two-wheeled vehicle allows and blocks, as desired, transmission of a drive force of an engine to a transmission and a driving wheel. It has an input member coupled to the side of the engine. An output member is coupled to the side of the transmission and the driving wheel. A clutch member is coupled to the output member. A pressure member moves closer to and away from the clutch member. The power transmission device is configured to enable transmission of power with driving clutch plates and driven clutch plates brought into press contact with each other. This occurs by bringing the pressure member into proximity to the clutch member. In order to block transmission of power, the press-contact force is released between the driving clutch plates and the driven clutch plates by moving the pressure member away from the clutch member.

Japanese Unexamined Utility Model Registration Application Publication No. 62-143827, for example, discloses a power transmission device according to the related art. It includes a weight member (coil spring 16) that can bring driving clutch plates and driven clutch plates into press contact with each other. This occurs by moving the weight member from a radially inner position to a radially outer position of a groove portion using a centrifugal force due to rotation of a clutch housing. With such a power transmission device according to the related art, a centrifugal force can be applied to the weight member when the clutch housing rotates along with drive of an engine. A drive force of the engine can be transmitted to a wheel by bringing the driving clutch plates and the driven clutch plates into press contact with each other.

The power transmission device according to the related art described above has a cam mechanism with a long hole 32 and a pin 30. A pressing flange 28 can be moved toward the driving clutch plates and the driven clutch plates by moving a clutch hub 13 in the axial direction while rotating the clutch hub 13 using the cam, that is composed of the long hole 32 and the pin 30, even if the weight member is located at the radially inner position. This brings the clutch plates into press contact with each other to apply engine brake.

In the power transmission device according to the related art described above, in order to apply engine brake, power on the side of the wheel can be transmitted to the side of the engine by engaging a clutch by bringing the driving clutch plates and the driven clutch plates into press contact with each other using the cam mechanism (back torque transmission cam). The cam mechanism is composed of the long hole 32 and the pin 30. However, power is transmitted via the long hole 32 and the pin 30 when the weight member is moved to the radially outer position and the pressure member is moved to the actuation position. Thus, the pin 30 may be damaged by a load during the power transmission.

The present disclosure has been made in view of the foregoing situation. The disclosure provides a power transmission device that can apply engine brake by transmitting a rotational force on the side of a wheel to the side of an engine by bringing driving clutch plates and driven clutch plates into press contact with each other when a pressure member is located at a non-actuation position. This enables power transmission to be performed stably when a weight member is moved to a radially outer position and the pressure member is moved to an actuation position.

SUMMARY

The disclosure provides a power transmission device that comprises a clutch housing that is rotatable together with an input member. The input member is rotatable by a drive force of an engine of a vehicle. A plurality of driving clutch plates are attached to the clutch housing. A clutch member is coupled to an output member that can rotate a wheel of the vehicle. A plurality of driven clutch plates, formed alternately with the driving clutch plates of the clutch housing, are attached to the clutch member. A pressure member moves between an actuation position and a non actuation position. In the actuation position, the drive force of the engine can be transmitted to the wheel with the driving clutch plates and the driven clutch plates brought into press contact with each other. In the non-actuation position, transmission of the drive force of the engine to the wheel can be blocked by releasing a press-contact force between the driving clutch plates and the driven clutch plates. A weight member is disposed in a groove portion provided in the clutch housing. The groove portion extends in a radial direction. The weight member moves from a radially inner position to a radially outer position of the groove portion. A centrifugal force causes the movement due to rotation of the clutch housing. An interlocking member moves the pressure member from the non-actuation position to the actuation position as the weight member is moved from the radially inner position to the radially outer position. The clutch member includes a first clutch member coupled to the output member and a second clutch member. The driven clutch plates are attached to the second clutch member. A back torque transmission cam brings the driving clutch plates and the driven clutch plates into press contact with each other by moving the second clutch member when the pressure member is located at the non-actuation position. A rotational force is input to the first clutch member via the output member. A torque transmission portion, formed on each of the first clutch member and the second clutch member, transmits a rotational force transmitted to the second clutch member to the first clutch member not via the back torque transmission cam.

The disclosure provides the power transmission device further including a movement amount restriction portion formed on each of the first clutch member and the second clutch member. The movement amount restriction portion restricts an amount of movement of the second clutch member due to the back torque transmission cam.

The disclosure provides the power transmission device with a projection formed on one of the first clutch member and the second clutch member. The torque transmission portion is formed from one side surface of the projection. A first abutment surface abuts against the one side surface and receive a rotational force. The movement amount restriction portion is formed from the other side surface of the projection. A second abutment surface abuts against the other side surface and restrict an amount of movement.

The disclosure provides the power transmission device further including a press-contact assist cam. It includes a first gradient surface, formed on the first clutch member, and a second gradient surface, formed on the pressure member, facing each other. The press-contact assist cam increases the press-contact force between the driving clutch plates and the driven clutch plates when a rotational force input to the input member can be transmitted to the output member.

The disclosure provides the power transmission device further including a back torque limiter cam. It includes a first gradient surface, formed on the first clutch member, and a second gradient surface, formed on the pressure member, facing each other. The back torque limiter cam releases the press-contact force between the driving clutch plates and the driven clutch plates when the clutch member and the pressure member are rotated relative to each other with rotation of the output member exceeding a rotational speed of the input member. The back torque transmission cam is configured to be actuated before actuation of the back torque limiter cam.

The back torque transmission cam brings the driving clutch plates and the driven clutch plates into press contact with each other. This occurs by moving the second clutch member when the pressure member is located at the non-actuation position and a rotational force is input to the first clutch member, via the output member. The torque transmission portion is formed on each of the first clutch member and the second clutch member. It can transmit a rotational force transmitted to the second clutch member to the first clutch member not via the back torque transmission cam. Thus, engine brake can be applied with the rotational force on the side of the wheel transmitted to the side of the engine by bringing the driving clutch plates and the driven clutch plates into press contact with each other when the pressure member is located at the non-actuation position. Power can be transmitted stably when the weight member is moved to the radially outer position and the pressure member is moved to the actuation position.

The movement amount restriction portion is formed on each of the first clutch member and the second clutch member. It restricts the amount of movement of the second clutch member due to the back torque transmission cam. Thus, the second clutch member can be moved by the back torque transmission cam within a set range.

A projection is formed on one of the first clutch member and the second clutch member. The torque transmission portion is formed from one side surface of the projection. A first abutment surface abuts against the one side surface and receive a rotational force. The movement amount restriction portion is formed from the other side surface of the projection. A second abutment surface abuts against the other side surface and restrict an amount of movement. Thus, the projection can have the function of both the torque transmission portion and the movement amount restriction portion.

A press-contact assist cam includes the first gradient surface, formed on the first clutch member, and the second gradient surface, formed on the pressure member, facing each other. The press-contact assist cam increases the press-contact force between the driving clutch plates and the driven clutch plates when the rotational force input to the input member is transmitted to the output member. Thus, the press-contact force, due to the press-contact assist cam, can be applied in addition to the press-contact force due to movement of the weight member, due to a centrifugal force. This brings the driving clutch plates and the driven clutch plates into press contact with each other more smoothly and reliably.

A back torque limiter cam includes the first gradient surface, formed on the first clutch member, and the second gradient surface, formed on the pressure member, facing each other. It releases the press-contact force between the driving clutch plates and the driven clutch plates when the clutch member and the pressure member are rotated relative to each other with rotation of the output member exceeding the rotational speed of the input member. Thus, transmission of excessive power to the side of the engine via the input member can be avoided when the weight member is located at the radially outer position. The back torque transmission cam is actuated before actuation of the back torque limiter cam. This enables actuation using the back torque transmission cam to be performed reliably.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a power transmission.

FIG. 2 is a vertical sectional view of FIG. 1.

FIG. 3 is an enlarged cross-section view of a press-contact assist cam of the power transmission device.

FIG. 4 is a perspective view of a housing portion of a clutch housing of the power transmission device.

FIG. 5 is a perspective view of a cover portion of the clutch housing of the power transmission device.

FIG. 6 is a front plan view of a first clutch member of the power transmission device.

FIG. 7 is a side elevation view of a second clutch member of the power transmission device.

FIG. 8 is a rear plan view of a pressure member of the power transmission device.

FIG. 9 is a perspective view of a state before assembly in a first direction of the first clutch member, the second clutch member, and the pressure member of the power transmission device.

FIG. 10 is a perspective view of a state before assembly in a second direction of the first clutch member, the second clutch member, and the pressure member of the power transmission device.

FIG. 11 is a perspective view of a state after assembly of the first clutch member, the second clutch member, and the pressure member of the power transmission device.

FIG. 12 is a cross-section view of the action of the press-contact assist cam of the power transmission device.

FIG. 13 is a cross-section view of the action of a back torque limiter cam of the power transmission device.

FIG. 14 is a plan side elevation partially in section and exploded view of the first clutch member and the second clutch member of the power transmission device assembled together.

FIG. 15 is a perspective partially in section view of the first clutch member and the second clutch member of the power transmission device assembled together.

FIG. 16 is a plan side elevation partially in section and exploded view of the first clutch member and the second clutch member of the power transmission device assembled together.

FIG. 17 is a perspective view in section view of the first clutch member and the second clutch member of the power transmission device assembled together.

FIG. 18 is a cross-section view of the action of a back torque transmission cam of the power transmission device, illustrating a state before the back torque transmission cam is actuated.

FIG. 19 is a cross-section view of the action of the back torque transmission cam of the power transmission device, illustrating a state after the back torque transmission cam is actuated.

FIG. 20 is a cross-section view of the power transmission device with a weight member located between a radially inner position and a radially outer position and with the back torque transmission cam located at a non-actuation position.

FIG. 21 is a cross-section view of the power transmission device with the weight member located at the radially outer position and with the back torque transmission cam located at the non-actuation position.

FIG. 22 is a cross-section view of the power transmission device with the weight member located at the radially inner position and with the back torque transmission cam located at the actuation position.

FIG. 23 is a cross-section view of the power transmission device with the weight member located between the radially inner position and the radially outer position and with the back torque transmission cam located at an actuation position.

FIG. 24 is a cross-section view of the power transmission device with the weight member located at the radially outer position and with the back torque transmission cam located at the actuation position.

FIG. 25 is a cross-section section view of a power transmission device according to a different embodiment of the present disclosure.

FIG. 26 is an enlarged sectional view illustrating the internal configuration of the power transmission device.

DETAILED DESCRIPTION

Embodiments of the present disclosure will be specifically described below while referring to the drawings.

A power transmission device according to the present embodiment is disposed in a vehicle such as a two-wheeled vehicle to enable and block transmission of a drive force of an engine to the side of a transmission and a driving wheel. As illustrated in FIGS. 1 to 19, the power transmission device is mainly composed of a clutch housing 2 formed with an input gear 1 (input member). The input gear 1 is rotatable by the drive force of the engine of the vehicle. A clutch member includes a first clutch member 4a and second clutch member 4b. A pressure member 5 is attached to the right side, in FIG. 2, of the clutch member, first clutch member 4a and second clutch member 4b. A plurality of driving clutch plates 6 and a plurality of driven clutch plates 7 are interleaved with one another. A weight member 8, formed from a steel ball member, is movable (rollable) in the radial direction in the clutch housing 2 along an interlocking member 9. An actuation member 10 can be actuated by a manual operation or an actuator (not illustrated). In the drawings, reference symbol S denotes a spring damper; B1 denotes a roller bearing; and B2 and B3 each denote a thrust bearing.

The input gear 1 is rotatable about an output shaft 3 when a drive force (rotational force) is transmitted from the engine. The input gear 1 is coupled to the clutch housing 2 by a rivet R etc. The clutch housing 2 is configured to have a housing portion 2a formed from a cylindrical member that opens on the right end side in FIG. 2. The housing portion 2a is coupled to the input gear 1. A cover portion 2b is attached to the housing portion 2a to cover the opening. The clutch housing 2 is rotatable along with rotation of the input gear 1 by the drive force of the engine.

As illustrated in FIG. 4, the housing portion 2a, of the clutch housing 2, is formed with a plurality of notches 2aa in the circumferential direction. The plurality of driving clutch plates 6 are attached and fit with the notches 2aa. Each of the driving clutch plates 6 is formed from a plate material formed in a generally circular ring shape. The driving clutch plates 6 are configured to be rotatable along with rotation of the clutch housing 2. Also, the driving clutch plates 6 are slidable in the axial direction (right-left direction in FIG. 2).

Further, as illustrated in FIG. 5, the cover portion 2b of the clutch housing 2 is formed with a plurality of groove portions 2ba. The groove portion 2ba are in the bottom surface of the cover portion portion 2b. The groove portion 2ba extend in the radial direction of the cover portion 2b. The weight members 8 are disposed in each of the groove portions 2ba. When the clutch housing 2 is stationary, when the engine is stationary or idling, and or rotating at a low speed, the weight member 8 is located at the radially inner position (the position indicated in FIG. 2). When the clutch housing 2 is rotating at a high speed, the weight member 8 is located at the radially outer position (the position indicated in FIG. 21).

The clutch member, first clutch member 4a and second clutch member 4b, has the plurality of driven clutch plates 7. The driven clutch plates 7 are alternately positioned with the driving clutch plates 6 of the clutch housing 2. The driven clutch plates 7 are coupled to the output shaft 3, output member, that rotates the wheel of the vehicle. The clutch member includes the assembly of two members, namely the first clutch member 4a and the second clutch member 4b, together.

As illustrated in FIG. 6, the first clutch member 4a is formed from a circular plate member. A flange surface 4ac is formed over the peripheral edge portion. The output shaft 3 is inserted through an insertion hole 4ad (see FIGS. 2 and 6) formed in the center of the first clutch member 4a. Splines formed on the output shaft 3 and the first clutch member 4a mesh with each other. Thus, the output shaft 3 and the first clutch member 4a are coupled to each other in the rotational direction. As illustrated in FIGS. 6, 9, and 10, the first clutch member 4a is formed with gradient surfaces 4aa. These gradient surfaces 4aa form a press-contact assist cam. Gradient surfaces 4ab form a back torque limiter cam.

As illustrated in FIG. 7, the second clutch member 4b is formed from a circular ring member. The driven clutch plates 7 are attached, through spline fitting, to a spline fitting portion 4ba (see FIGS. 2 and 7) formed on the outer peripheral surface of the second clutch member 4b. As illustrated in FIGS. 9 to 11, the pressure member 5 is assembled to the clutch member, first clutch member 4a and second clutch member 4b. The plurality of driving clutch plates 6 and driven clutch plates 7 are attached and stacked alternately between a flange surface 5c (see FIGS. 2 and 8) of the pressure member 5 and the flange surface 4ac (see FIGS. 2 and 6) of the clutch member 4a.

As illustrated in FIG. 8, the pressure member 5 is formed from a circular plate member. The flange surface 5c is formed over the peripheral edge portion. The pressure member 5 is movable between an actuation position, FIG. 21, and a non-actuation position, FIG. 2. In the actuation position, the driving clutch plates 6 and the driven clutch plates 7 are brought into press contact with each other. This enables transmission of the drive force of the engine to the wheel. In the non-actuation position, the press-contact force between the driving clutch plates 6 and the driven clutch plates 7 is released to block transmission of the drive force of the engine to the wheel.

More specifically, as illustrated in FIGS. 7, 9, and 10, the spline fitting portion 4ba, formed on the second clutch member 4b, includes a recessed and projecting shape integrally formed generally over the entire circumference of the outer peripheral side surface of the second clutch member 4b. With the driven clutch plates 7 fit in recessed grooves spline fitting portion 4ba, movement of the driven clutch plates 7 in the rotational direction is regulated while allowing movement of the driven clutch plates 7, with respect to the first clutch member 4a, in the axial direction. This allows rotation of the driven clutch plates 7 together with the second clutch member 4b.

The driven clutch plates 7 are formed and stacked alternately with the driving clutch plates 6. Thus, the adjacent clutch plates 6 and 7 can be brought into press contact with each other and the press-contact force therebetween can be released. That is, the clutch plates 6 and 7 are allowed to slide in the axial direction of the second clutch member 4b. When the pressure member 5 is moved leftward in FIG. 2, the flange surface 5c of the pressure member 5 and the flange surface 4ac of the clutch member 4 are brought into proximity to each other. Thus, the clutch plates 6 and 7 are brought into press contact with each other. The rotational force of the clutch housing 2 is transmitted to the output shaft 3, via the second clutch member 4b and the first clutch member 4a. When the pressure member 5 is moved rightward in FIG. 2, the flange surface 5c of the pressure member 5 and the flange surface 4ac of the first clutch member 4a are moved away from each other. Thus, the press-contact force between the clutch plates 6 and 7 is released. The rotational force is not transmitted to the output shaft 3 since the first clutch member 4a and the second clutch member 4b are not following rotation of the clutch housing 2.

Thus, the rotational force, the drive force of the engine, input to the clutch housing 2, is transmitted to the side of the wheel via the output shaft 3, output member. This occurs when the driving clutch plates 6 and the driven clutch plates 7 are brought into press contact with each other. Also, transmission of the rotational force, the drive force of the engine, input to the clutch housing 2 to the output shaft 3, output member, can be blocked when the press contact is released between the driving clutch plates 6 and the driven clutch plates 7.

Further, in the present embodiment, as illustrated in FIGS. 3, 6, 8, 9, and 10, the first clutch member 4a is formed with the gradient surfaces 4aa and 4ab. The pressure member 5 is formed with gradient surfaces 5a and 5b, that face the gradient surfaces 4aa and 4ab, respectively. That is, the gradient surfaces 4aa and the gradient surfaces 5a abut against each other to form a press-contact assist cam. The gradient surface 4ab and the gradient surface 5b abut against each other to form a back torque limiter cam.

The rotational speed of the engine is raised to establish a state where a rotational force input to the input gear 1 and the clutch housing 2 can be transmitted to the output shaft 3, via the first clutch member 4a and the second clutch member 4b, with the weight members 8 at the radially outer position. Accordingly, a rotational force in direction A is applied to the pressure member 5 as illustrated in FIG. 12. Thus, a force in the direction C in the drawing is generated for the pressure member 5 by the action of the press-contact assist cam. Consequently, the pressure member 5 is moved in the direction (leftward in FIG. 2) where the flange surface 5c is further brought into proximity to the flange surfaces 4ac of the first clutch member 4a, which increases the press-contact force between the driving clutch plates 6 and the driven clutch plates 7.

When rotation of the output shaft 3, during travel of the vehicle, exceeds the rotational speed of the input gear 1 and the clutch housing 2, back torque is generated in the direction B in FIG. 13. The pressure member 5 is moved in the direction D in the drawing by the action of the back torque limiter cam. Thus, the press-contact force is released between the driving clutch plates 6 and the driven clutch plates 7. Consequently, this avoids trouble of the power transmission device or a power source (engine side) due to back torque.

The weight members 8 are disposed in the groove portions 2ba provided in the cover portion 2b of the clutch housing 2. The groove portions 2ba extend in the radial direction. The weight members 8 bring the driving clutch plates 6 and the driven clutch plates 7 into press contact with each other by moving from the radially inner position, see FIG. 2, to the radially outer position (see FIG. 21) of the groove portions 2ba. This occurs by generation of a centrifugal force due to rotation of the clutch housing 2. That is, the rolling surfaces, bottom surfaces, of the groove portions 2ba for the weight members 8, are sloped upward from the radially inner position toward the radially outer position. When the clutch housing 2 is stationary, the weight members 8 are held at the radially inner position by the biasing force of a spring h. When the clutch housing 2 is rotated, the weight members 8 are moved along the upward slope, by the centrifugal force applied to the weight members 8 (see FIG. 20), to the radially outer position (see FIG. 21) when the clutch housing 2 reaches a predetermined rotational speed.

The spring h is deflected until the separation distance between the driving clutch plates 6 and the driven clutch plates 7 becomes zero. A clutch spring 11 is deflected to bring the driving clutch plates 6 and the driven clutch plates 7 into press contact with each other. During shifting, the spring h is expanded and the clutch spring 11 is contracted to move the pressure member 5.

The interlocking member 9 is formed from a circular ring member disposed in the clutch housing 2 (cover portion 2b). The interlocking member 9 is fit with the groove portions that are formed in the inner peripheral surface of the cover portion 2b. It is coupled to be rotatable together with the clutch housing 2 and movable in the right-left direction in FIG. 2. The interlocking member 9 is configured to move leftward in FIG. 2 against the biasing force of the clutch spring 11 along with movement of the weight members 8 from the radially inner position to the radially outer position. The interlocking member 9 moves the pressure member 5 from the non-actuation position to the actuation position by pressing the pressure member 5.

The clutch spring 11 is formed from a coil spring interposed between the interlocking member 9 and the pressure member 5. The clutch spring 11 moves the pressure member 5 in the direction to bring the driving clutch plates 6 and the driven clutch plates 7 into press contact with each other by pressing the pressure member 5 along with movement of the interlocking member 9. The clutch spring 11 can absorb the pressing force of the pressure member 5 against the interlocking member 9 during actuation of the actuation member 10.

That is, when the weight members 8 are moved from the radially inner position to the radially outer position, along with rotation of the clutch housing 2 and the interlocking member 9 being pressed by the weight members 8, the pressing force is transmitted to the pressure member 5 via the clutch spring 11. As illustrated in FIGS. 20 and 21, the pressure member 5 is moved leftward in the drawings to bring the driving clutch plates 6 and the driven clutch plates 7 into press contact with each other and actuate the actuation member 10 in that state. The pressure member 5 is moved rightward in the drawings by the pressing force of the actuation member 10. The pressing force against the interlocking member 9 is absorbed by the clutch spring 11 to hold the position of the interlocking member 9, positions the weight members 8.

The actuation member 10 is formed from a member (see FIG. 2) that is operable manually or by an actuator. The actuation member 10 can move the pressure member 5 in the direction (rightward in FIG. 2) of releasing the press-contact force between the driving clutch plates 6 and the driven clutch plates 7. The actuation member 10 can be moved rightward in FIG. 2 by operation on a clutch pedal, a clutch lever, etc. of the vehicle or actuation of an actuator, for example, to abut against the pressure member 5. This disengages the clutch, blocking power transmission, by releasing the press-contact force between the driving clutch plates 6 and the driven clutch plates 7 by moving the pressure member 5 in the same direction.

Here, the power transmission device according to the present embodiment has a back torque transmission cam (cam surfaces K1 and T1). The back torque transmission cam can bring the driving clutch plates 6 and the driven clutch plates 7 into press contact with each other by moving the second clutch member 4b when a rotational force is input to the first clutch member 4a via the output shaft 3, output member, when the pressure member 5 is located at the non-actuation position. As illustrated in FIGS. 14 to 17, such a back torque transmission cam includes cam surfaces (K1 and T1) formed integrally with respective mating surfaces, mating surfaces for assembly, of the first clutch member 4a and the second clutch member 4b.

As illustrated in FIGS. 6 and 9, the cam surfaces K1 are formed from a plurality of gradient surfaces formed over the entire circumference on the radially inner side of the flange surface 4ac, the mating surface with the second clutch member 4b, formed on the first clutch member 4a. The cam surfaces K1 are formed on end surfaces, on one side, of a plurality of groove portions K formed in a circular ring shape along the peripheral edge portion of the first clutch member 4a. That is, the first clutch member 4a is formed with the plurality of groove portions K that extend in the circumferential direction. End surfaces of the groove portions K, on one side, are formed as gradient surfaces including the cam surfaces K1 of the back torque transmission cam, as illustrated in FIGS. 18 and 19. As illustrated in the drawings, end surfaces of the groove portions K on the other side are formed as wall surfaces K2. The wall surfaces K2 extend in the axial direction, right-left direction in FIGS. 18 and 19, of the first clutch member 4a.

As illustrated in FIGS. 7 and 10, the cam surfaces T1 are formed from a plurality of gradient surfaces formed over the entire circumference on the bottom surface, the mating surface with the first clutch member 4a, of the second clutch member 4b. The gradient surfaces are formed on end surfaces, on one side, of a plurality of projecting portions T formed in a circular ring shape along the bottom surface of the second clutch member 4b. That is, the second clutch member 4b is formed with the plurality of projecting portions T that extend in the circumferential direction. End surfaces of the projecting portions T, on one side, are formed as gradient surfaces to constitute the cam surfaces T1 of the back torque transmission cam, as illustrated in FIGS. 18 and 19. As illustrated in the drawings, end surfaces of the projecting portions T on the other side are formed as wall surfaces T2. The wall surfaces T2 extend in the axial direction, right-left direction in FIGS. 18 and 19, of the second clutch member 4b.

When the first clutch member 4a and the second clutch member 4b are assembled together, the projecting portions T fit into the groove portions K as illustrated in FIGS. 14 and 15. The cam surfaces K1 and the cam surfaces T1 face each other. This forms a back torque transmission cam. The wall surfaces K2 and the wall surfaces T2 face each other with a predetermined distance away from each other as illustrated in FIG. 18. Thus, when the pressure member 5 is located at the non-actuation position and a rotational force is input to the first clutch member 4a via the output shaft 3, the first clutch member 4a is relatively rotated with respect to the second clutch member 4b. Thus, as illustrated in FIGS. 16, 17, and 19, the second clutch member 4b is moved rightward in FIGS. 2 and 19, with respect to the first clutch member 4a, by the action of the cam between the cam surfaces K1 and the cam surfaces T1.

On the other hand, as illustrated in FIG. 7, the second clutch member 4b is formed with a pressing portion 4bb on the extension of the spline fitting portion 4ba. When the second clutch member 4b is moved rightward in FIG. 2, the second clutch member 4b presses the leftmost driven clutch plate 7 in the drawing, among the driving clutch plates 6 and the driven clutch plates 7 which are attached as stacked, in the same direction. Consequently, the driving clutch plates 6 and the driven clutch plates 7 can be brought into press contact with each other, even if the pressure member 5 is located at the non-actuation position. Thus, a rotational force input from the output shaft 3, output member, can be transmitted to the side of the engine to apply engine brake.

In particular, the back torque transmission cam, according to the present embodiment, is configured to hold abutment between the interlocking member 9 and the weight members 8. This happens by moving the second clutch member 4b in the direction (rightward in FIG. 2) of being brought into proximity to the interlocking member 9. That is, when the back torque transmission cam is actuated to move the second clutch member 4b rightward in FIG. 2, the driving clutch plates 6 and the driven clutch plates 7 are brought into press contact with each other. The pressure member 5 is pressed in the same direction. Thus, the pressing force is transmitted to the interlocking member 9, via the clutch spring 11, which holds abutment between the interlocking member 9 and the weight members 8.

Thus, due to rotation of the clutch housing, if the interlocking member 9 and the weight members 8 are moved away from each other during actuation of the back torque transmission cam, the interlocking member 9 occasionally cannot follow movement of the weight members 8 between the radially inner position and the radially outer position. With the present embodiment, abutment between the interlocking member 9 and the weight members 8 can be held even during actuation of the back torque transmission cam. The interlocking member 9 can be caused to stably follow movement of the weight members 8.

Further, a plurality of cam surfaces K1 and T1 that constitute the back torque transmission cam, according to the present embodiment, are formed along the circular ring shape. The driven clutch plates 7 are attached to the second clutch member 4*b*. That is, the cam surfaces K1 and T1 are formed along the projection shape (circular ring shape). The driven clutch plates 7 are pressed by the pressing portion 4*bb* when the back torque transmission cam is actuated. Consequently, the pressing portion 4*bb* can apply a generally uniform pressing force to the driven clutch plates 7 by the action of the back torque transmission cam. This brings the driving clutch plates 6 and the driven clutch plates 7 into press contact with each other more efficiently.

Furthermore, the back torque transmission cam, cam constituted with the cam surfaces K1 and the cam surfaces T1 according to the present embodiment, is configured to be actuated before actuation of the back torque limiter cam. The back torque limiter cam includes with the gradient surfaces 4*ab* and the gradient surfaces 5*b*. That is, the back torque transmission cam can be actuated before actuation of the back torque limiter cam. The clearance, dimension of a gap, between the cam surfaces K1 and the cam surfaces T1 is set to be smaller than the clearance, dimension of a gap, between the gradient surfaces 4*ab* and the gradient surfaces 5*b*.

Here, the power transmission device includes a torque transmission portion formed on each of the first clutch member 4*a* and the second clutch member 4*b*. The torque transmission portion transmits a rotational force transmitted to the second clutch member 4*b* to the first clutch member 4*a*, not via the back torque transmission cam (cam surfaces K1 and cam surfaces T1). A movement amount restriction portion formed on each of the first clutch member 4*a* and the second clutch member 4*b* restricts the amount of movement of the second clutch member 4*b* due to the back torque transmission cam (cam surfaces K1 and cam surfaces T1).

That is, a plurality of, three in the present embodiment, projections F are formed integrally with the first clutch member 4*a* at equal intervals in the circumferential direction, as illustrated in FIGS. 6 and 9. Projecting portions G are formed integrally with the second clutch member 4*b* to extend inward as illustrated in FIGS. 7 and 9. When the first clutch member 4*a* and the second clutch member 4*b* are assembled together, each projection F is interposed between two projecting portions G, as illustrated in FIGS. 14 to 17. One side surface F1 of the projection F and an abutment surface, first abutment surface G1, of one of the projecting portions G face each other. The other side surface F2 of the projection F and an abutment surface, second abutment surface G2, of the other projecting portion G face each other.

Thus, the one side surface F1 of the projection F, formed on the first clutch member 4*a*, and the first abutment surface G1 of the one projecting portion G, formed on the second clutch member 4*b*, constitute the torque transmission portion. That is, when the clutch is engaged, to transmit a drive force, the driving clutch plates 6 and the driven clutch plates 7 are in press contact with each other. The pressure member 5 is moved to the actuation position. The wall surfaces K2 of the groove portions K and the wall surfaces T2 of the projecting portions T of the back torque transmission cam are held away from each other (see FIG. 18). The one side surface F1 of the projection F and the first abutment surface G1 of the projecting portion G abut against each other, as illustrated in FIGS. 14 and 15. Accordingly, this enables reception and transmission of a rotational force of the second clutch member 4*b* to the first clutch member 4*a*.

Meanwhile, the other side surface F2 of the projection F, formed on the first clutch member 4*a*, and the second abutment surface G2 of the other projecting portion G, formed on the second clutch member 4*b*, constitute the movement amount restriction portion. That is, when the pressure member 5 is located at the non-actuation position and a rotational force is input to the first clutch member 4*a* via the output shaft 3, the first clutch member 4*a* and the second clutch member 4*b* are rotated relative to each other. Thus, the second clutch member 4*b* is moved by the action of the cam between the cam surfaces K1 of the groove portions K and the cam surfaces T1 of the projecting portions T of the back torque transmission cam (see FIG. 19). When the amount of movement reaches a set value, the other side surface F2 of the projection F and the second abutment surface G2 of the projecting portion G abut against each other as illustrated in FIGS. 16 and 17. Thus, relative rotation of the second clutch member 4*b* with respect to the first clutch member 4*a* is regulated. Thus, the amount of movement of the second clutch member 4*b* at the time when the back torque transmission cam is actuated can be restricted.

Here, the projection F is formed on the first clutch member 4*a*. Also, the projecting portion G is formed on the second clutch member 4*b*. Instead, however, the projecting portion G may be formed on the first clutch member 4*a*, and the projection F may be formed on the second clutch member 4*b*. In this case, the one side surface F1 of the projection F, formed on the second clutch member 4*b*, and the first abutment surface G1 of the one projecting portion G, formed on the first clutch member 4*a*, constitute the torque transmission portion according to the present embodiment. The other side surface F2 of the projection F, formed on the second clutch member 4*b*, and the second abutment surface G2 of the other projecting portion G, formed on the first clutch member 4*a*, constitute the movement amount restriction portion according to the present embodiment.

Next, the action of the back torque transmission cam according to the present embodiment will be described.

When the engine is stationary or idling or the rotational speed of the input gear 1 is low, the drive force of the engine is not transmitted to the input gear 1. Therefore, as illustrated in FIG. 2, the weight members 8 are located at the radially inner position. The pressure member 5 is located at the non-actuation position. At this time, when a rotational force is input to the first clutch member 4*a* via the output shaft 3 (output member), as illustrated in FIG. 22, the second clutch member 4*b* is moved rightward in the drawing by the action of the back torque transmission cam. The driving clutch plates 6 and the driven clutch plates 7 are brought into press contact with each other to transmit the rotational force to the side of the engine.

When the vehicle starts after the vehicle is stationary or idling, the rotational speed of the input gear 1 transitions from a low speed to a high speed (middle speed range). Therefore, as illustrated in FIG. 21, the weight members 8 are located between the radially inner position and the radially outer position. The pressure member 5 is located between the non-actuation position and the actuation position. At this time, when a rotational force is input to the first clutch member 4a via the output shaft 3, output member, with the clutch operated by the actuation member 10 and with the pressure member 5 located at the non-actuation position, as illustrated in FIG. 23, the second clutch member 4b is moved rightward in the drawing by the action of the back torque transmission cam. The driving clutch plates 6 and the driven clutch plates 7 are brought into press contact with each other to transmit a rotational force to the side of the engine.

When the vehicle accelerates and travels in a high speed range after starting, the rotational speed of the input gear 1 is high. Therefore, as illustrated in FIG. 21, the weight members 8 are located at the radially outer position. The pressure member 5 is located at the actuation position. At this time, when a rotational force is input to the first clutch member 4a via the output shaft 3, output member, with the clutch operated by the actuation member 10 and with the pressure member 5 located at the non-actuation position, as illustrated in FIG. 24, the second clutch member 4b is moved rightward in the drawing by the action of the back torque transmission cam. The driving clutch plates 6 and the driven clutch plates 7 are brought into press contact with each other to transmit a rotational force to the side of the engine.

With the embodiment described above, the back torque transmission cam can hold abutment between the interlocking member 9 and the weight members 8 by moving the second clutch member 4b in the direction of being brought into proximity to the interlocking member 9. Thus, when the pressure member 5 is located at the non-actuation position, engine brake can be applied by transmitting the rotational force on the side of the wheel to the side of the engine by bringing the driving clutch plates 6 and the driven clutch plates 7 into press contact with each other. Thus, actuation using the weight members 8 can be performed stably when engine brake is applied.

The back torque transmission cam according to the present embodiment is composed of the cam surfaces (K1 and T1) integrally formed with the first clutch member 4a and the second clutch member 4b, respectively. The cam surfaces (K1 and T1) are formed on the respective mating surfaces of the first clutch member 4a and the second clutch member 4b. Thus, the second clutch member 4b can be moved reliably and smoothly by the back torque transmission cam.

Further, the press-contact assist cam includes the gradient surfaces 4aa, formed on the first clutch member 4a, and the gradient surfaces 5a, formed on the pressure member 5, facing each other. This increases the press-contact force between the driving clutch plates 6 and the driven clutch plates 7 when the rotational force that is input to the input gear 1, input member, can be transmitted to the output shaft 3, output member. Thus, the press-contact force, due to the press-contact assist cam, can be applied in addition to the press-contact force due to the movement of the weight members 8 due to centrifugal force. This brings the driving clutch plates 6 and the driven clutch plates 7 into press contact with each other more smoothly and reliably.

Furthermore, the back torque limiter cam includes the gradient surfaces 4ab, formed on the first clutch member 4a, and the gradient surfaces 5b, formed on the pressure member 5, facing each other. The back torque limiter cam can release the press-contact force between the driving clutch plates 6 and the driven clutch plates 7 when the clutch member, first clutch member 4a, and the pressure member 5 are rotated relative to each other with rotation of the output shaft 3, output member, exceeding the rotational speed of the input gear 1, input member. Thus, transmission of excessive power to the side of the engine via the input gear 1 can be avoided when the weight members 8 are located at the radially outer position. The back torque transmission cam is actuated before actuation of the back torque limiter cam. This enables actuation using the back torque transmission cam to be performed reliably.

Additionally, the back torque transmission brings the driving clutch plates 6 and the driven clutch plates 7 into press contact with each other by moving the second clutch member 4b when the pressure member 5 is located at the non-actuation position. A rotational force is input to the first clutch member 4a via the output shaft 3, output member. The torque transmission portion is formed on each of the first clutch member 4a and the second clutch member 4b. Thus, the torque transmission portion can transmit a rotational force transmitted to the second clutch member 4b to the first clutch member 4a not via the back torque transmission cam (cam surfaces K1 and cam surfaces T1). Thus, engine brake can be applied with the rotational force on the side of the wheel transmitted to the side of the engine by bringing the driving clutch plates 6 and the driven clutch plates 7 into press contact with each other when the pressure member 5 is located at the non-actuation position. Power can be transmitted stably when the weight members 8 are moved to the radially outer position and the pressure member 5 is moved to the actuation position.

The movement amount restriction portion is formed on each of the first clutch member 4a and the second clutch member 4b. The movement amount restriction portion restricts the amount of movement of the second clutch member 4b due to the back torque transmission cam. Thus, the second clutch member 4b can be moved by the back torque transmission cam within a set range.

Further, the projection F is formed on one of the first clutch member 4a and the second clutch member 4b. The torque transmission portion is formed from the one side surface F1 of the projection F. The first abutment surface G1 abuts against the one side surface F1 to receive a rotational force. The movement amount restriction portion is formed from the other side surface F2 of the projection F. The second abutment surface G2 abuts against the other side surface F2 to restrict the amount of movement. Thus, the projection F can have the function of both the torque transmission portion and the movement amount restriction portion.

While the present embodiment has been described above, the present disclosure is not limited thereto. For example, as illustrated in FIGS. 25 and 26, the weight members 8 may be movably disposed in the housing portion 2a of the clutch housing 2. Also in this case, the back torque transmission cam is composed of the cam surfaces (K1 and T1) that are formed on the first clutch member 4a and the second clutch member 4b, respectively. When the pressure member 5 is located at the non-actuation position and a rotational force is input to the first clutch member 4a, via the output shaft 3, output member, the back torque transmission cam can bring the driving clutch plates 6 and the driven clutch plates 7 into press contact with each other by moving the second clutch member 4b. The torque transmission portion is formed on each of the first clutch member 4a and the second clutch member 4b. The torque transmission portion can transmit a rotational force transmitted to the second clutch member 4b to the first clutch member 4a not via the back torque transmission cam.

The cam surfaces K1 and T1, that constitute the back torque transmission cam according to the present embodiment, may be formed at different positions of the first clutch member 4a and the second clutch member 4b from those described above. Further, in the present embodiment, both the press-contact assist cam and the back torque limiter cam are provided in addition to the back torque transmission cam. However, only the press-contact assist cam may be provided, or neither of the press-contact assist cam and the back torque limiter cam may be provided.

Furthermore, the back torque transmission cam according to the present embodiment is configured to hold abutment between the interlocking member 9 and the weight members 8 by moving the second clutch member 4b in the direction of being brought into proximity to the interlocking member 9. However, the present disclosure may also be applied to devices that use a cam pin etc. or devices where the second clutch member 4b is moved in the direction of approaching the interlocking member 9. The power transmission device according to the present disclosure is applicable to a variety of power transmission devices of a multi-plate clutch type for automobiles, three-wheeled and four-wheeled buggies, general-purpose machines, etc., besides two-wheeled vehicles.

The power transmission device includes a first clutch member coupled to the output member. A second clutch member includes the driven clutch plates. A back torque transmission cam brings the driving clutch plates and the driven clutch plates into press contact with each other by moving the second clutch member when the pressure member is located at the non-actuation position. A rotational force is input to the first clutch member via the output member. A torque transmission portion, formed on each of the first clutch member and the second clutch member, transmits a rotational force transmitted to the second clutch member to the first clutch member not via the back torque transmission cam. This device can also be applied to devices with different appearances or shapes, devices with other additional functions, etc.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A power transmission device comprising:
a clutch housing rotatable with an input member, the input member rotatable by a drive force of an engine of a vehicle, a plurality of driving clutch plates attached to the clutch housing;
a clutch member coupled to an output member that can rotate a wheel of the vehicle, a plurality of driven clutch plates alternating with the driving clutch plates of the clutch housing, the driven clutch plates attached to the clutch member;
a pressure member movable between an actuation position and a non-actuation position, in the actuation position the drive force of the engine can be transmitted to the wheel with the driving clutch plates and the driven clutch plates brought into press contact with each other, in the non-actuation position, transmission of the drive force of the engine to the wheel can be blocked by releasing a press-contact force between the driving clutch plates and the driven clutch plates;
a weight member disposed in a groove portion in the clutch housing, the groove portion extends in a radial direction, the weight member is movable by a centrifugal force, due to rotation of the clutch housing, from a radially inner position to a radially outer position of the groove portion; and
an interlocking member moves the pressure member from the non-actuation position to the actuation position as the weight member is moved from the radially inner position to the radially outer position,
the clutch member includes
a first clutch member coupled to the output member,
a second clutch member attached to the driven clutch plates, and
a back torque transmission cam bringing the driving clutch plates and the driven clutch plates into press contact with each other by moving the second clutch member when the pressure member is located at the non-actuation position and a rotational force is input to the first clutch member via the output member, and
a torque transmission portion formed on each of the first clutch member and the second clutch member to transmit a rotational force transmitted to the second clutch member to the first clutch member not via the back torque transmission cam.

2. The power transmission device according to claim 1, further comprising a movement amount restriction portion formed on each of the first clutch member and the second clutch member to restrict an amount of movement of the second clutch member due to the back torque transmission cam.

3. The power transmission device according to claim 2, wherein a projection is formed on one of the first clutch member and the second clutch member, the torque transmission portion is formed from one side surface of the projection, a first abutment surface abuts against the one side surface and receive a rotational force, the movement amount restriction portion is formed from an other side surface of the projection and a second abutment surface abuts against the other side surface and restricts an amount of movement.

4. The power transmission device according to claim 1, further comprising a press-contact assist cam including a gradient surface, formed on the first clutch member, and a gradient surface, formed on the pressure member, facing each other, the press-contact assist cam increasing the press-contact force between the driving clutch plates and the driven clutch plates when a rotational force input to the input member can be transmitted to the output member.

5. The power transmission device according to claim 1, further comprising a back torque limiter cam including a gradient surface, formed on the first clutch member, and a gradient surface, formed on the pressure member, facing each other, the back torque limiter cam releasing the press-contact force between the driving clutch plates and the driven clutch plates when the clutch member and the pressure member are rotated relative to each other with rotation of the output member exceeding a rotational speed of the input member, and the back torque transmission cam configured to be actuated before actuation of the back torque limiter cam.

* * * * *